(12) United States Patent
Valinsky et al.

(10) Patent No.: US 11,332,312 B2
(45) Date of Patent: May 17, 2022

(54) AUTOMATED STORAGE AND RETRIEVAL SYSTEM AND METHODS

(71) Applicant: Opex Corporation, Moorestown, NJ (US)

(72) Inventors: Joseph Valinsky, Moorestown, NJ (US); Robert R. DeWitt, Marlton, NJ (US); Alexander Stevens, Philadelphia, PA (US); Dhruva Kumar, Narbeth, PA (US)

(73) Assignee: OPEX Corporation, Moorestown, NJ (US)

( * ) Notice: Subject to any disclaimer, the term of this patent is extended or adjusted under 35 U.S.C. 154(b) by 13 days.

(21) Appl. No.: 16/995,905

(22) Filed: Aug. 18, 2020

(65) Prior Publication Data

US 2021/0032035 A1 Feb. 4, 2021

Related U.S. Application Data

(63) Continuation of application No. 16/557,100, filed on Aug. 30, 2019, now Pat. No. 10,759,601, which is a
(Continued)

(51) Int. Cl.
*B65G 1/137* (2006.01)
*B65G 1/04* (2006.01)

(52) U.S. Cl.
CPC ......... *B65G 1/1375* (2013.01); *B65G 1/0421* (2013.01); *B65G 1/0435* (2013.01); *B65G 1/0492* (2013.01); *B65G 2201/0235* (2013.01)

(58) Field of Classification Search
CPC .. B65G 1/1375; B65G 1/0421; B65G 1/0435; B65G 1/0492; B65G 2201/0235
See application file for complete search history.

(56) References Cited

U.S. PATENT DOCUMENTS 3,547,282 A 12/1970 Harbauer
5,407,316 A * 4/1995 Coatta ..................... B65G 1/06
414/277
(Continued)

FOREIGN PATENT DOCUMENTS

DE 2223561 1/1974
DE 3805712 9/1989
(Continued)

OTHER PUBLICATIONS

International Search Report issued in Application No. PCT/US18/019789 dated May 29, 2018.
(Continued)

*Primary Examiner* — Kyle O Logan
(74) *Attorney, Agent, or Firm* — Stephen H. Eland

(57) ABSTRACT

A method for operating an automated storage and retrieval system includes transferring a first item storage container from an aisle to a first region of a first storage location, positioning a second item storage container in the aisle proximate the first item storage container, interlocking the second item storage container to the first item storage container by engaging a releasable coupling structure extending there between, and applying, in a first direction transverse to the aisle, a force to the second item storage container sufficient in magnitude and duration to cause the first item storage container to occupy the second region of the first storage location and the second item storage container to occupy the first region of the first storage location, whereby the first and second item storage containers remain interlocked while in the first storage location.

14 Claims, 20 Drawing Sheets

Related U.S. Application Data continuation of application No. 15/905,783, filed on Feb. 26, 2018, now Pat. No. 10,633,186.

(60) Provisional application No. 62/463,399, filed on Feb. 24, 2017.

(56) References Cited

U.S. PATENT DOCUMENTS

| | | | |
|---|---|---|---|
| 7,861,844 | B2 | 1/2011 | Hayduchok et al. |
| 8,104,601 | B2 | 1/2012 | Hayduchok et al. |
| 8,276,740 | B2 | 10/2012 | Hayduchok et al. |
| 8,417,373 | B2 | 9/2013 | Clo' |
| 8,622,194 | B2 | 1/2014 | DeWitt et al. |
| 9,010,517 | B2 | 4/2015 | Hayduchok et al. |
| 9,334,116 | B2 | 5/2016 | DeWitt et al. |
| 9,687,833 | B2 | 6/2017 | Kanaya et al. |
| 9,815,625 | B2 | 11/2017 | DeWitt et al. |
| 10,052,661 | B2 | 8/2018 | Hayduchok et al. |
| 10,071,857 | B2 | 9/2018 | DeWitt et al. |
| 10,457,483 | B2 | 10/2019 | DeWitt et al. |
| 10,633,186 | B2 | 4/2020 | Valinsky et al. |
| 10,759,601 | B2 | 9/2020 | Valinsky et al. |
| 10,940,998 | B2 | 3/2021 | Valinsky et al. |
| 2002/0037208 | A1 | 3/2002 | Donato |
| 2006/0182551 | A1* | 8/2006 | Suess ............... B66F 9/07 414/277 |
| 2006/0099055 | A1 | 11/2006 | Stefani |
| 2009/0074545 | A1 | 3/2009 | Lert, Jr. |
| 2011/0097182 | A1* | 4/2011 | Schmit ............. B65G 1/0407 414/277 |
| 2011/0101837 | A1* | 5/2011 | Solomon ............. G07F 11/64 312/319.1 |
| 2013/0155599 | A1* | 6/2013 | Ross ................. G06F 1/187 361/679.31 |
| 2014/0031972 | A1* | 1/2014 | DeWitt .............. B65G 1/0492 700/214 |
| 2015/0197397 | A1* | 7/2015 | Razumov ........... B65G 1/0492 414/279 |
| 2016/0130086 | A1* | 5/2016 | Yamashita .......... B65G 1/1373 414/807 |
| 2016/0355337 | A1* | 12/2016 | Lert .................. B65G 1/1378 |
| 2018/0037410 | A1* | 2/2018 | DeWitt .............. B07C 3/087 |

FOREIGN PATENT DOCUMENTS

| | | |
|---|---|---|
| DE | 102006049411 | 4/2008 |
| DE | 102008010060 | 9/2009 |
| DE | 202010003476 | 7/2011 |
| DE | 102012107176 | 2/2014 |
| EP | 126431 | 11/1984 |
| EP | 1193195 | 4/2002 |
| EP | 1193195 A | 4/2002 |
| EP | 2199248 | 6/2010 |
| ES | 2069491 | 5/1995 |
| JP | S61150908 | 7/1986 |
| JP | 2006-290594 | 10/2006 |
| JP | 2016-522492 | 8/2015 |
| WO | 2013155107 | 10/2013 |
| WO | 2015007514 | 1/2015 |
| WO | 2016172253 | 10/2016 |
| WO | 2016199033 | 12/2016 |

OTHER PUBLICATIONS

Examination Report from India issued in Application No. 201917030585 dated Sep. 1, 2021.
Examination Report from China issued in Application No. 20201126798.2 dated Jul. 21, 2021.
Examination Report from India issued in Application No. 201917030583 dated Jun. 24, 2021.
Examination Report issued in Japan for Application No. 2019-546017 dated Sep. 28, 2021.
Examination Report issued in Japan for Application No. 2019-546008 dated Sep. 28, 2021.
Examination Report issued in Europe dated Feb. 16, 2022 for Application No. 18 710 625.7.

* cited by examiner

AUTOMATED STORAGE AND RETRIEVAL SYSTEM AND METHODS

PRIORITY CLAIM

This application is a continuation of co-pending U.S. patent application Ser. No. 16/557,100 filed Aug. 30, 2019, which is a continuation of U.S. patent application Ser. No. 15/905,783 filed Feb. 26, 2018, now issued as U.S. Pat. No. 10,633,186. This application also claims priority to U.S. Provisional Patent Application No. 62/463,399 filed on Feb. 24, 2017. The entire disclosure of each of the foregoing applications is hereby incorporated herein by reference.

TECHNICAL FIELD

This disclosure relates to material handling systems and, more particularly, to systems and methods for storing items within parallel, vertical arrays of storage locations.

BACKGROUND

Storing items and retrieving items (e.g., to fill discrete customer orders) can be laborious and time consuming. Many large organizations have extensive storage areas in which numerous and diverse items are stored and/or from which they are retrieved. Sorting and retrieving items from the hundreds or thousands of storage areas requires significant labor to perform manually.

By way of illustrative example, some automated storage and retrieval (ASR) systems utilize one or more three dimensional rack structures wherein each defines a first array of storage spaces and a second array of storage spaces. In such systems, the rack structure defines an aisle which extends the length and height of the two storage space arrays so that a storage container can be individually transported to, and inserted into, any vacant storage space of either array. Conversely, any storage container already disposed in one of the storage spaces of either array can be extracted and transported to a remote destination such, for example, as a picking station where a worker picks items from the storage containers.

SUMMARY OF THE INVENTION

Embodiments of the present disclosure are directed to automated storage and retrieval systems and methods by which item-containing storage containers are removed from and restored to storage positions which are more densely arranged than has heretofore been possible at a comparable rate of throughput.

In embodiments, a plurality of detachably coupled storage containers are interlocked together, one behind the other(s), until any one of them is to be retrieved from a single storage location of an array of storage locations. Such in-situ interlocking permits two or more storage containers to be stored, as a group, in a space-efficient manner within a single, aisle-facing storage space location. As well, withdrawal of an aisle-facing storage container from a storage location causes any remaining interlocked storage container(s) of the same group to advance toward the aisle as part of the same operation. Interlocking containers in accordance with the present disclosure therefore obviates the need for a complex, multiple-container gripping structure having the ability to move all containers at the same time and/or the need to reposition the containers in sequence in order to expose a needed container of a group.

According to one embodiment, a method for operating an automated storage and retrieval system comprises transferring a first item storage container, from an aisle of a rack structure defining parallel arrays of storage locations accessible from the aisle, to a first region of a first storage location proximal to the aisle; positioning a second item storage container in the aisle proximate the first item storage container; interlocking the second item storage container to the first item storage container using a releasable coupling structure extending there between; and applying, in a first direction transverse to the aisle, a force to the second item storage container sufficient in magnitude and duration to cause the first item storage container to occupy a second region of the first storage location and the second item storage container to occupy the first region of the first storage location, whereby the first and second item storage containers remain interlocked while in the first storage location.

According to an aspect of the method, the transferring includes transporting the first item storage container within the aisle and into a position of alignment with the first storage location.

According to another aspect of the method, the transferring further includes, after transporting the first item storage container within the aisle, applying a force to the first item storage container sufficient in magnitude and duration to cause the first item storage container to occupy the first region of the first storage location.

According to a further aspect of the method, forces are applied in the first direction to a surface of the first item storage container.

According to a further aspect of the method, the transporting is performed by operating a first independently movable vehicle, of a plurality of independently movable vehicles, to move at least one of horizontally or vertically within the aisle and into a position of alignment with the first storage location.

According to a further aspect of the method, wherein the transferring further includes operating the first independently movable vehicle to apply a force to the first item storage container sufficient in magnitude and duration to cause the first item storage container to occupy the first region of the first storage location.

According to a further aspect of the method, a second independently movable vehicle, of the plurality of independently movable vehicles, is moved at least one of horizontally or vertically within the aisle and into a position aligning a releasable coupling component of the second item storage container with a releasable coupling component of the first item storage container.

According to a further aspect of the method, interlocking of the first and second item storage containers is performed by operating the second independently movable vehicle to move into a position bringing the releasable coupling component of the second item storage container into interlocking engagement with the releasable coupling component of the first item storage container.

According to a further aspect of the method, the second independently movable vehicle is operated to apply forces to the second item storage container while the releasable coupling component of the second item storage container is maintained in interlocking engagement with the releasable coupling component of the first item storage container.

According to a further aspect of the method, the first independently movable vehicle is operated to move into a charging area following transfer of the first item storage container to the first storage location and the second independently movable vehicle is operated to move into the charging area following transfer of the second item storage container.

According to a further aspect of the method, force is applied to the second item storage container in a second direction opposite to the first direction, the force applied to the second item storage container being sufficient in magnitude and duration to cause withdrawal of the second item container from the first region of the first storage location and, at the same time, to cause the first item storage container to move from the second region of the first storage location into the first region of the first storage location.

According to a further aspect of the method, the second item storage container is decoupled from the first item storage container by disengaging the releasable coupling structure extending there between.

According to a further aspect of the method, the second item storage container is transferred to a new destination following decoupling of the second item storage container from the first item storage container.

According to a further aspect of the method, the new destination is a goods-to-person pick station and at least one item is one of added to or removed from the second item storage container.

According to a further aspect of the method, the new destination is the first region of a second storage location, and the second item is transferred to the first region of the second storage location by positioning the second item storage container in the aisle proximate a third item storage container occupying the first region of the second storage location; interlocking the second item storage container to the first item storage container by engaging a releasable coupling structure extending there between; and applying, in a direction transverse to the aisle, a force to the second item storage container sufficient in magnitude and duration to cause the third item storage container to occupy the second region of the second storage location and the second item storage container to occupy the first region of the second storage location.

According to a further aspect of the method, the second storage location is selected from among a plurality of storage locations having at least one vacant storage region, based on shortest distance to the first storage location.

According to a further embodiment, a method for storing and/or retrieving items by operating an automated storage and retrieval system comprises transferring a first item storage container from a first aisle to a first region of a first storage location; positioning a second item storage container in the first aisle proximate the first item storage container releasably coupling the second item storage container to the first item storage container, and applying a force to the second item storage container sufficient to cause the first item storage container to occupy a second region of the first storage location behind the first region and the second item storage container to occupy the first region of the first storage location.

According to an aspect of the method for storing and/or retrieving items, the transferring includes transporting the first item storage container within the first aisle and into a position of alignment with the first storage location.

According to another aspect of the method for storing and/or retrieving items, the transferring further includes operating a first independently movable vehicle to move the first item storage container into the first region of the first storage location.

According to yet another aspect of the method for storing and/or retrieving items, the positioning is performed by operating a second independently movable vehicle to align a releasable coupling component of the second item storage container with a releasable coupling component of the first item storage container.

According to still another aspect of the method for storing and/or retrieving items, the coupling is performed by operating the second independently movable vehicle to move the releasable coupling component of the second item storage container into interlocking engagement with the releasable coupling component of the first item storage container.

According to another aspect of the method for storing and/or retrieving items, a third independently movable vehicle is operated within a second aisle to withdraw the first item container from the first region of the first storage location while moving the second item storage container into the second region of the first storage location.

According to still another aspect of the method for storing and/or retrieving items, the first item storage container is decoupled from the second item storage container by disengaging the releasable coupling structure extending there between.

According another aspect of the method for storing and/or retrieving items, the second item storage container is transferred to a new destination following decoupling of the second item storage container from the first item storage container.

According to still another aspect of the method for storing and/or retrieving items, the new destination is a second storage location accessible from the first aisle and a second aisle.

According to another embodiment, a method of retrieving items by operating an automated storage and retrieval system having a rack structure for defining parallel arrays of storage locations separated by an aisle, each storage location of an array being accessible from at least one aisle, comprises disengaging a releasable coupling structure to decouple a first item storage container occupying a first region of a first storage location from a second item storage container occupying a second storage region of the first storage location; and transferring a decoupled one of the first item storage container and the second item storage container to a new destination following the disengaging.

According to an aspect of the method of retrieving items, the transferring includes operating an independently movable vehicle, of a plurality of independently movable vehicles, to move the decoupled item storage container at least one of horizontally or vertically within a first aisle.

According to another aspect of the method of retrieving items, the new destination is the first region of a second storage location, and transferring the second item to the first region of the second storage location comprises positioning the second item storage container in the first aisle proximate a third item storage container occupying the first region of the second storage location; engaging a releasable coupling structure to couple the first item storage container to the third item storage container; and applying, in a direction transverse to the aisle, a force to the second item storage container sufficient in magnitude and duration to cause the third item storage container to occupy the second region of the second storage location and the second item storage container to occupy the first region of the second storage location.

According to yet another aspect, the current invention provides a material handling system for storing or retrieving a plurality of items. The system includes three sets of spaced apart racks of storage locations. A plurality of first vehicles are operable within a first aisle formed between the first and second racks. The vehicles are operable to deliver items to and retrieve items from the storage locations in the first and second storage racks. A plurality of second vehicles are operable within a second aisle formed between the second and third racks. The second vehicles are operable to deliver items to and retrieve items from the storage locations in the second and third storage racks. The second rack is configured so that an item delivered to the second rack by one of the second vehicles can be retrieved from the second rack by one of the first vehicles. Optionally, the system includes a first track positioned adjacent a first side of the first rack, a second track positioned adjacent a first side of the second rack, a third track positioned adjacent a second side of the second rack and a fourth track positioned adjacent a first side of the third rack. The first and second tracks may guide the first vehicles around a loop in the first aisle and the third and fourth tracks may guide the vehicles around a loop in the second aisle. Additionally, each of the first, second third and fourth tracks may comprise a plurality of vertical track sections interconnected by a plurality of horizontal track sections. Further, each of the first, second and third racks may comprise an array of storage locations.

Optionally, the storage locations of the first, second or third storage rack is configured to accommodate a plurality of storage containers. Additionally, each of the storage containers may comprise one or more releasable connectors configured to releasably connect two storage containers. The releasable connection may allow the two storage containers to be connected to one another when the two storage containers are stored within one of the storage locations.

Optionally, the first vehicles may include a first transfer mechanism configured to transfer items into the storage locations in the second rack and the second vehicles may include a second transfer mechanism configured to transfer items from the storage locations in the second rack onto the second vehicles.

Optionally, a first picking station may be positioned along the first aisle wherein the first aisle is configured so that the first vehicles are able to retrieve items from the first or second racks and deliver the items to the first picking station. Additionally, a second picking station may be positioned along the second aisle wherein the second aisle is configured so that the second vehicles are able to retrieve items from the second or third racks and deliver the items to the second picking station. Further, the second rack may be configured so that items transferred to the second rack from one of the vehicles in the second aisle may be retrieved by one of the first vehicles in the first aisle and delivered to the first picking station so that items from the second aisle can be transferred to the first aisle and delivered to the first picking station.

Optionally, the first and second vehicles are independently operable self-propelled vehicles. Additionally, the first vehicles may be constrained to movement within the first aisle and the second vehicles may be constrained to movement within the second aisle. Further, the first rack may comprise a first array of bins disposed in a plurality of rows or columns, the second rack may comprise a second array of bins disposed in a plurality of rows or columns, and the third rack may comprise a third array of bins disposed in a plurality of rows or columns.

According to yet another aspect, the present invention provides a method for operating an automated storage and retrieval system. The method includes the step of conveying a first vehicle through a first aisle between a first rack of storage locations and a second rack of storage locations and conveying a second vehicle through a second aisle between the second rack of storage locations and a third rack of storage locations. An item is transferred from one of the storage location on the first rack to the first vehicle and the item is transferred from the first vehicle to a storage location on the second rack. The item is transferred from the second rack to the second vehicle and then transferred from the second vehicle to one of the storage locations on the third rack. Optionally, the step of conveying a first vehicle comprises driving the first vehicle along a first track adjacent the first rack and a second track adjacent the second rack and the step of conveying a second vehicle comprises driving the second vehicle along a third track adjacent a second side of the second rack and a fourth track adjacent the third rack. Additionally, the step of conveying a first vehicle may comprise driving the first vehicle around a first loop formed of a first plurality of generally vertical tracks connected with a first plurality of generally horizontal tracks and the step of conveying a second vehicle may comprise driving the second vehicle around a second loop formed of a second plurality of generally vertical tracks connected with a second plurality of generally horizontal tracks.

Optionally, the method includes the step of conveying the second vehicle and the item to a picking station positioned along the second aisle and presenting the item to an operator at the picking station.

Optionally, the item comprises a first storage container having a releasable connector and the method comprises the step of releasably connecting the first storage container with a second storage container located in the second rack. The method may also include the step of displacing the first storage container in the rack by displacing the second storage container connected to the first storage container. Additionally, the method may include the step of disconnecting the second storage container from the second storage container. The step of disconnecting may comprise displacing the first container relative to the second container.

Optionally, the step of transferring the item from the first vehicle to a storage location on the second rack may include the steps of aligning the first vehicle with the storage location on the second rack and operating a first transfer mechanism on the first vehicle to transfer the item to the storage location. Additionally, the step of transferring the item from the storage location on the second rack may include the steps of aligning the second vehicle with the storage location and operating a second transfer mechanism on the second vehicle to transfer the item to the second vehicle.

Optionally, the step of conveying a first vehicle through a first aisle may comprise constraining the first vehicle to travel within the first aisle and the step of conveying a second vehicle through a second aisle may comprise constraining the second vehicle to travel within the second aisle.

BRIEF DESCRIPTION OF THE DRAWINGS

The foregoing summary and the following detailed description of the preferred embodiments of the present invention will be best understood when read in conjunction with the appended drawings, in which.

Figure 1:
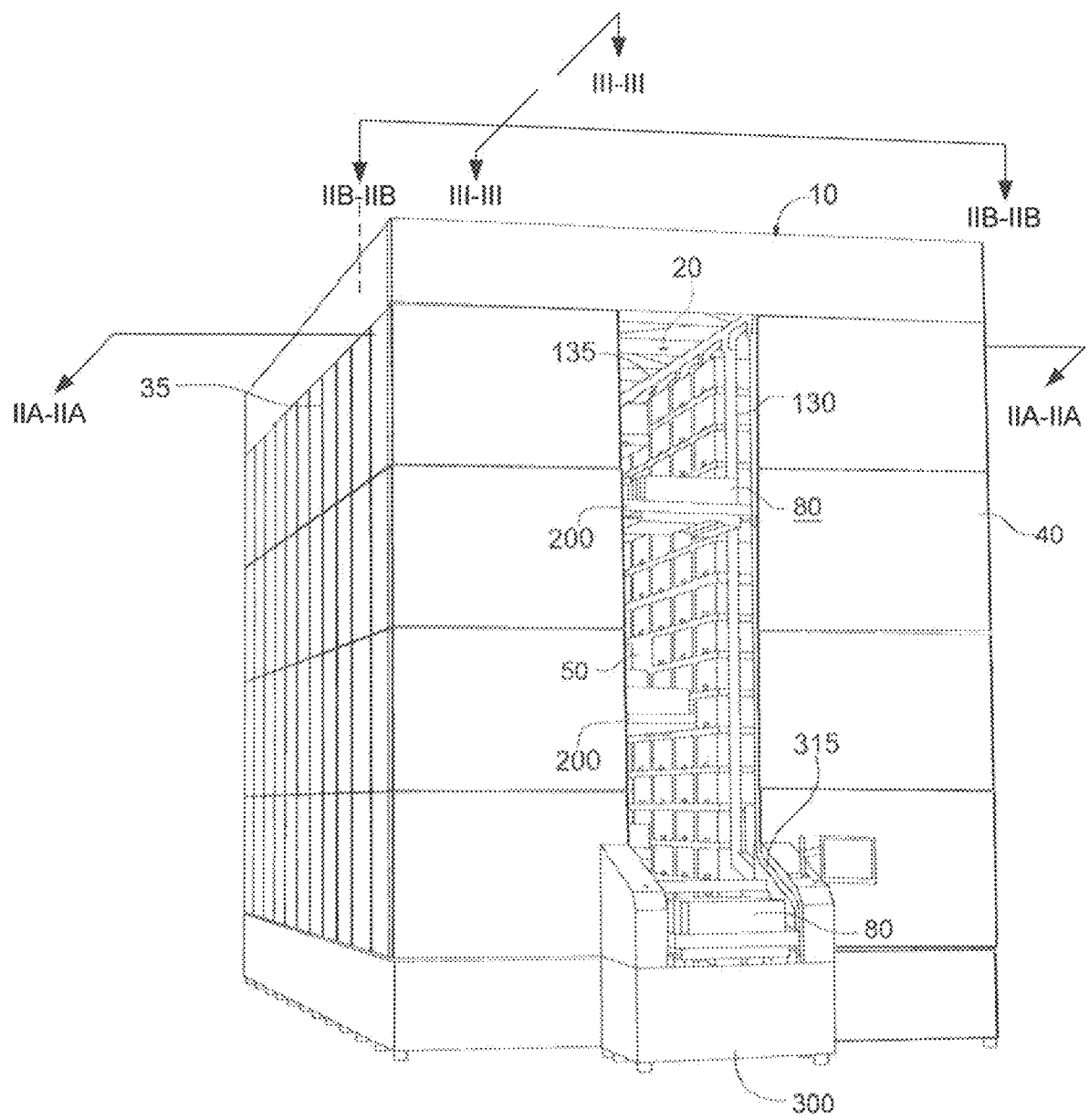
FIG. 1 is a perspective view of a single aisle, automated storage and retrieval (ASR) system according to one or more embodiments consistent with the present disclosure.
Figure 8:
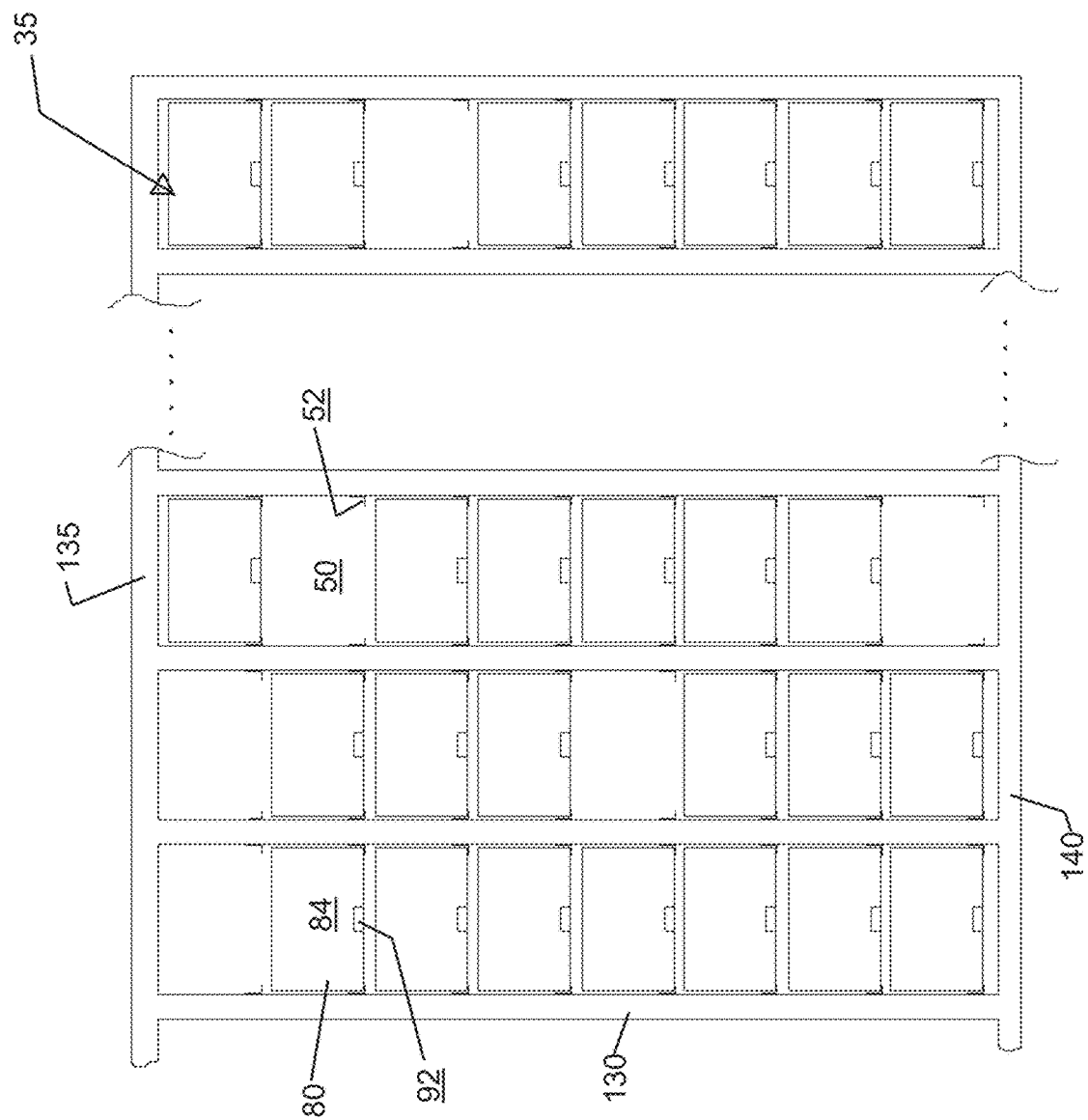
Figure 9:
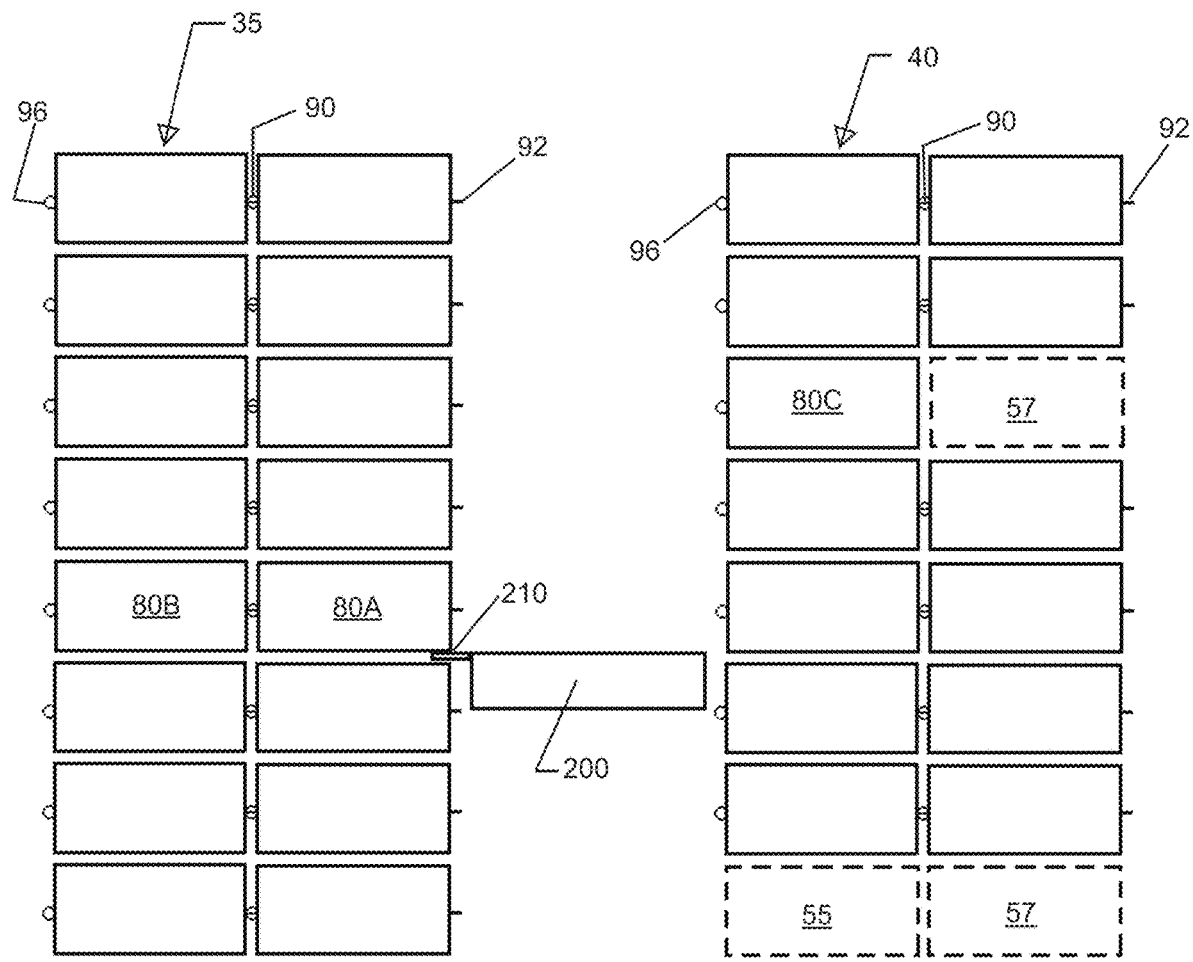
Figure 10A:
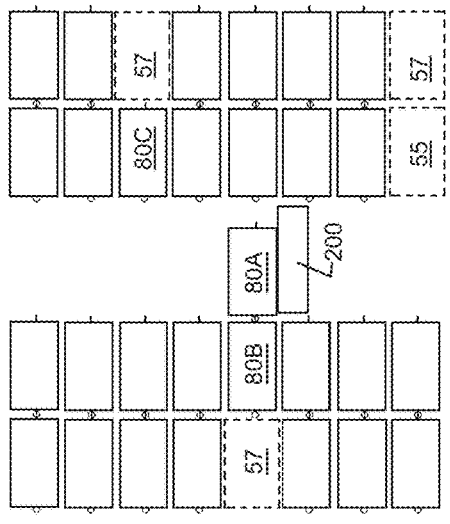
Figure 10B:
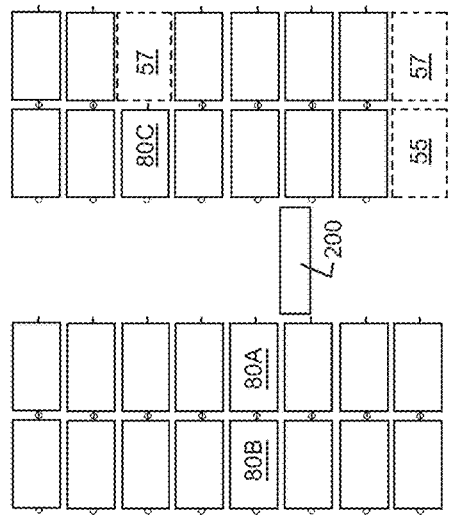
Figure 10C:
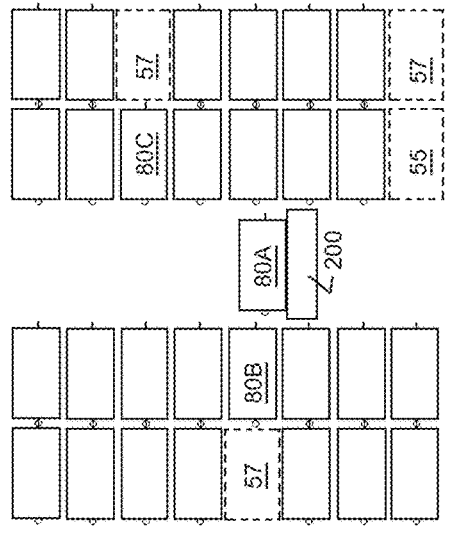
Figure 10D:
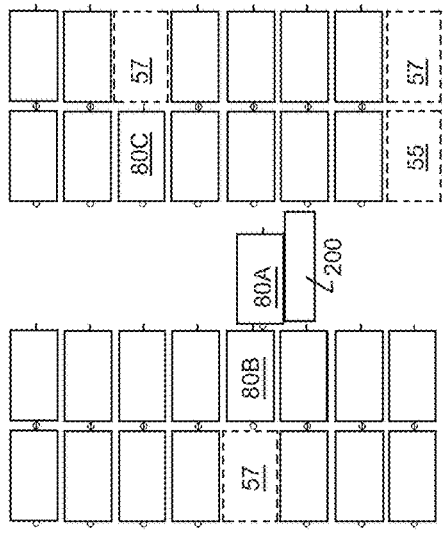
Figure 10E:
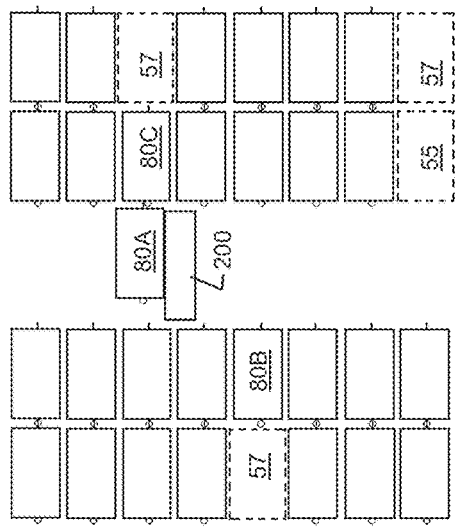
Figure 10F:
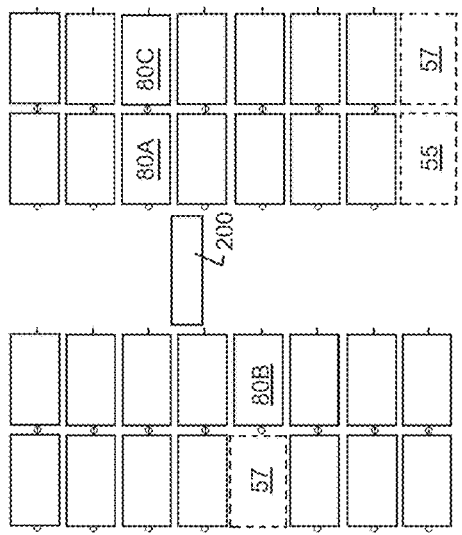
Figure 10G:
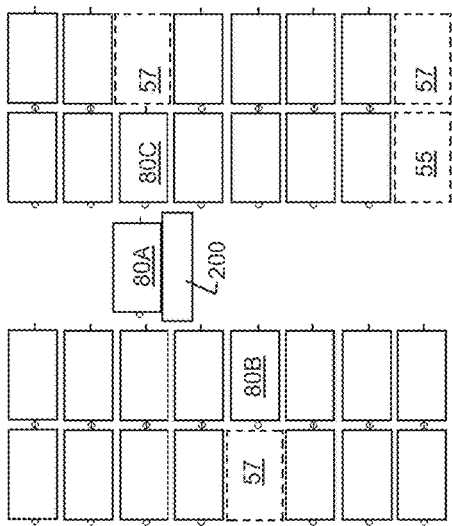
Figure 10H:
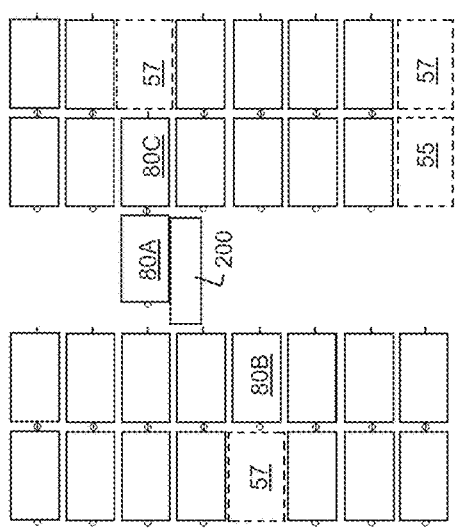
Figure 11:
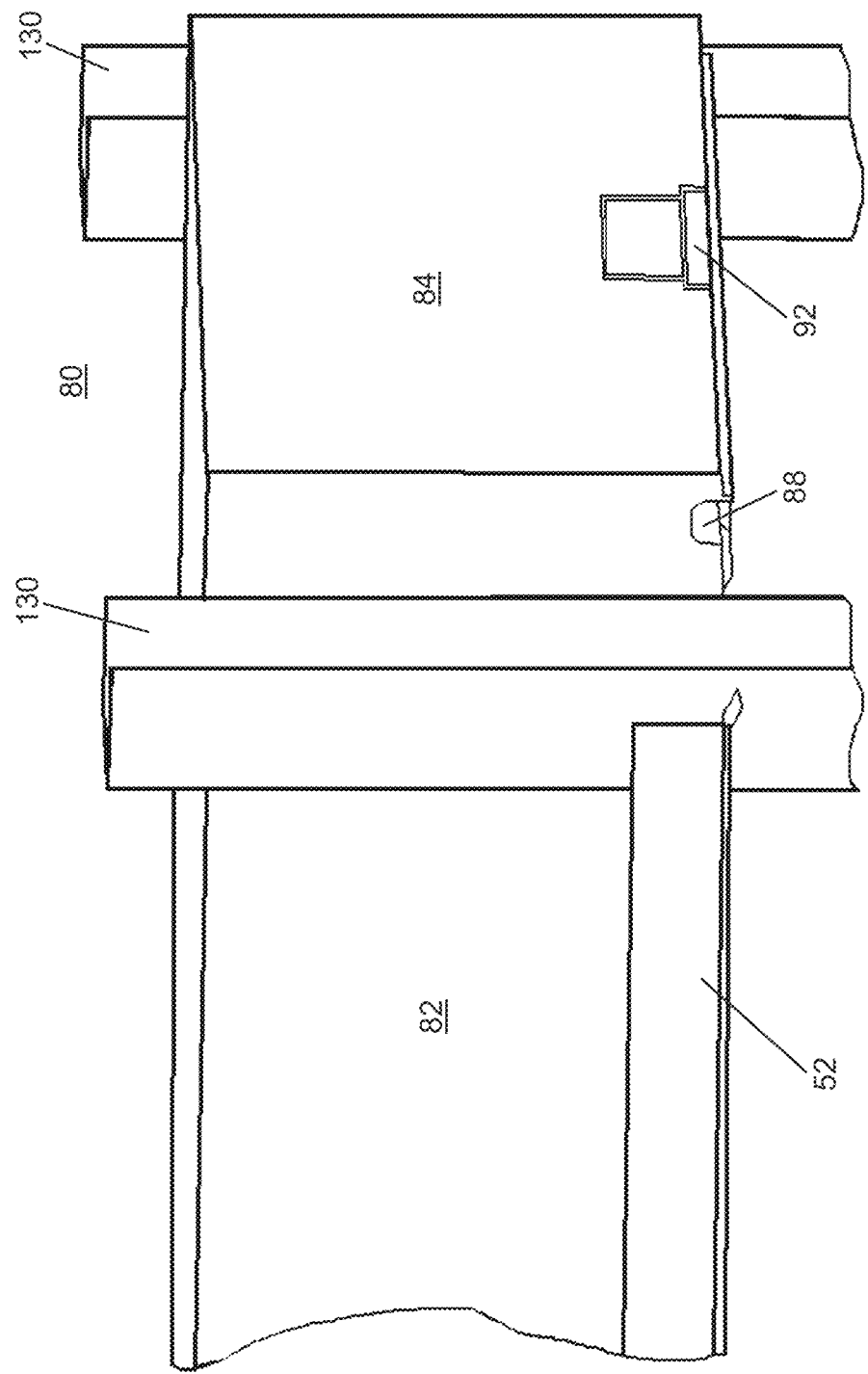
Figure 12:
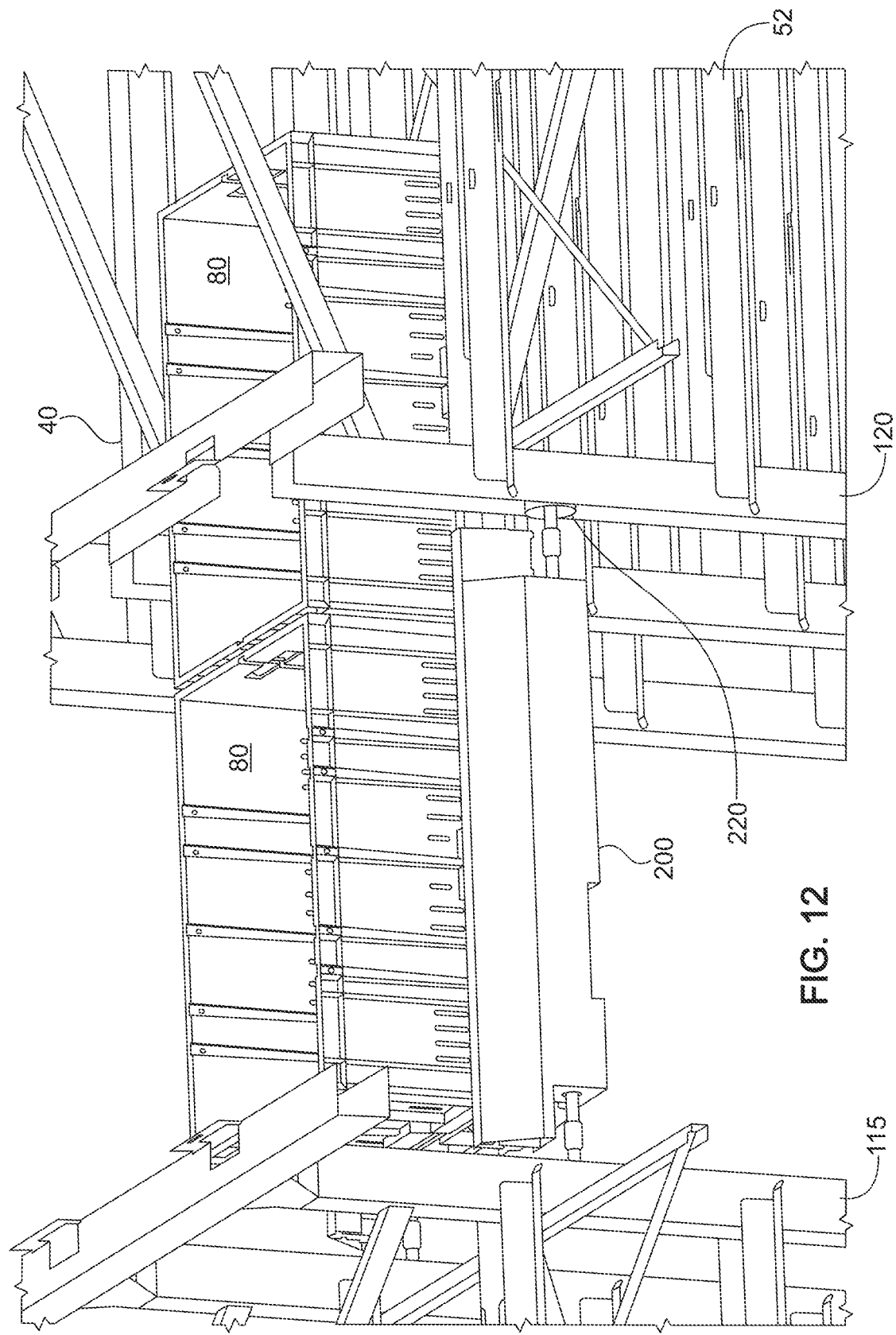
Figure 13:
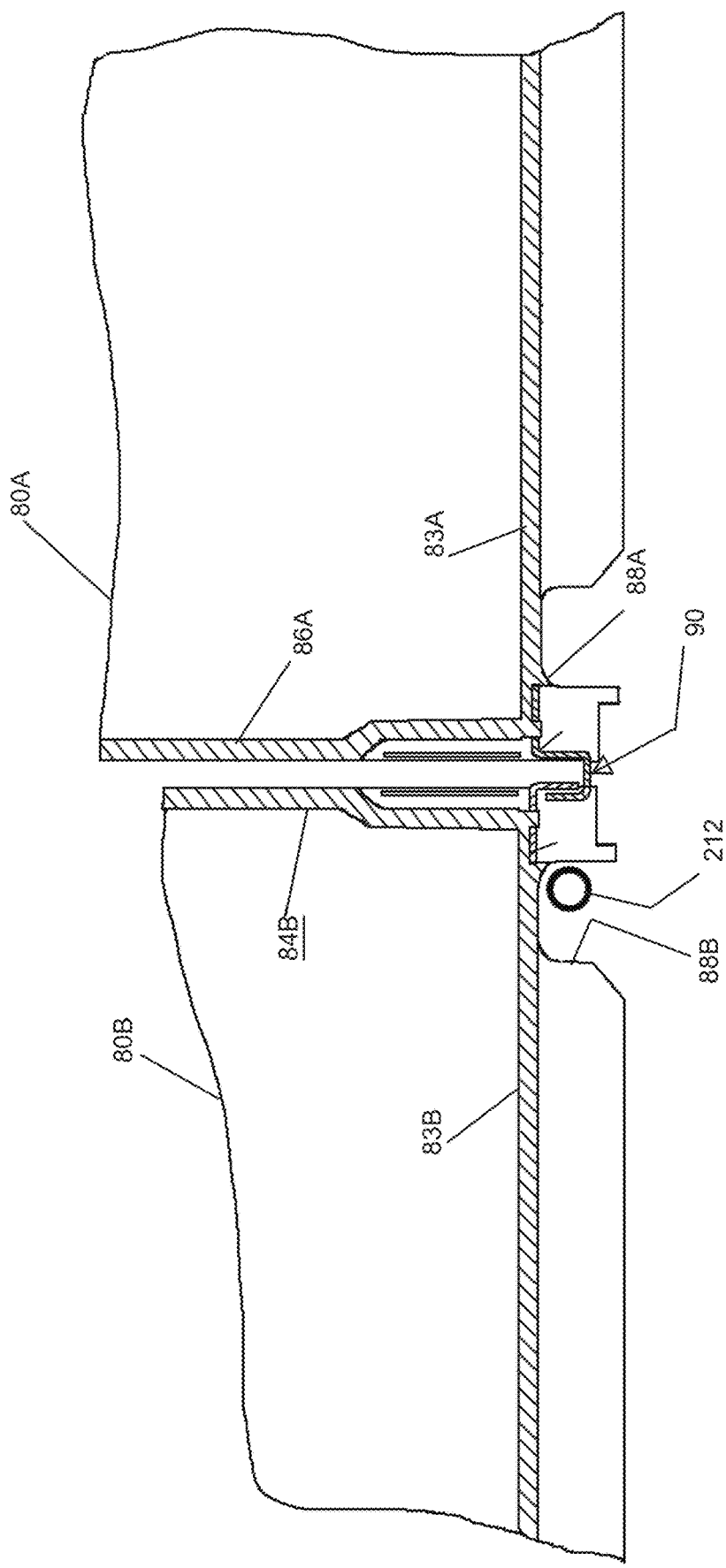
Figure 14:
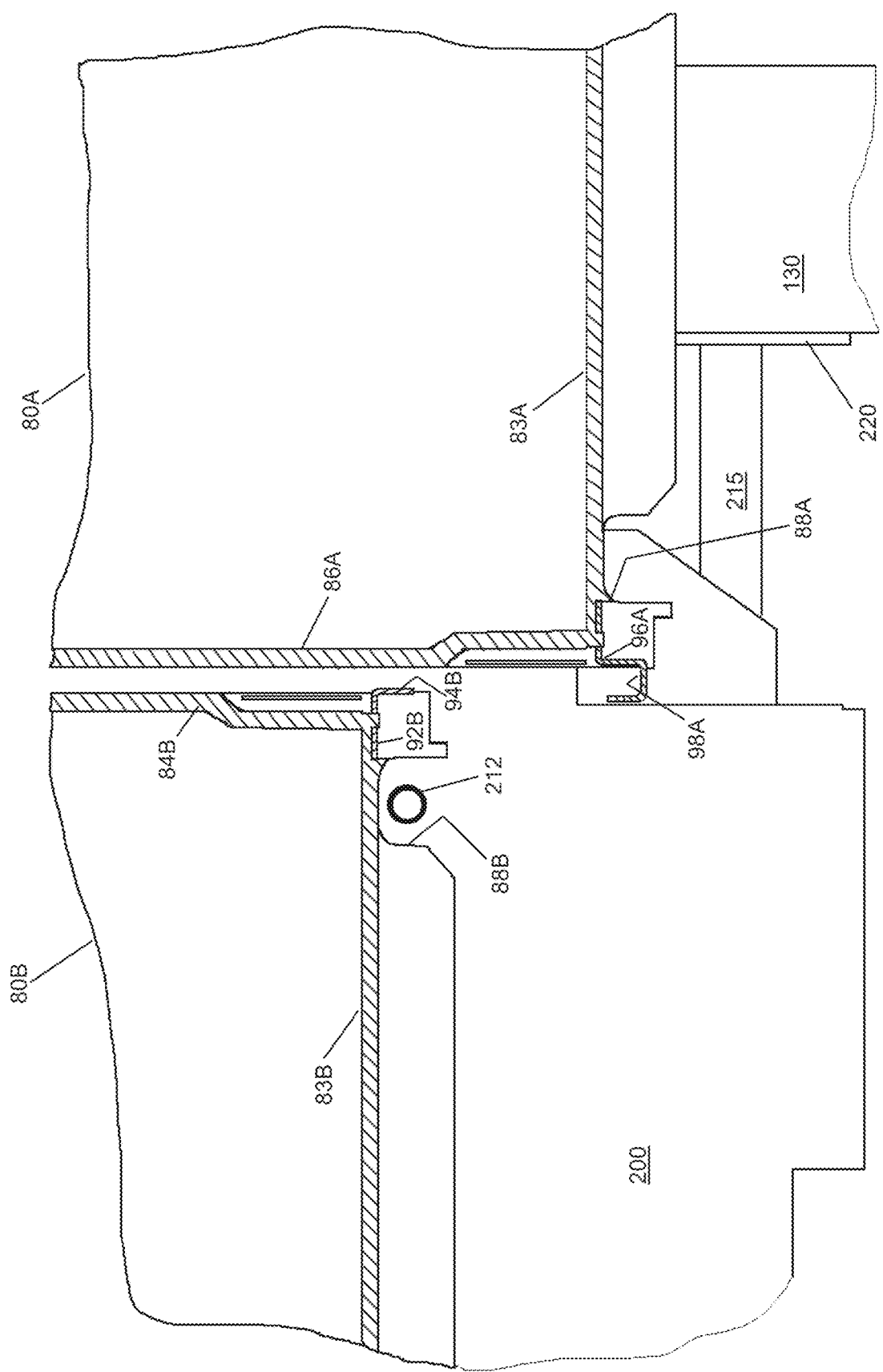
Figure 15A:
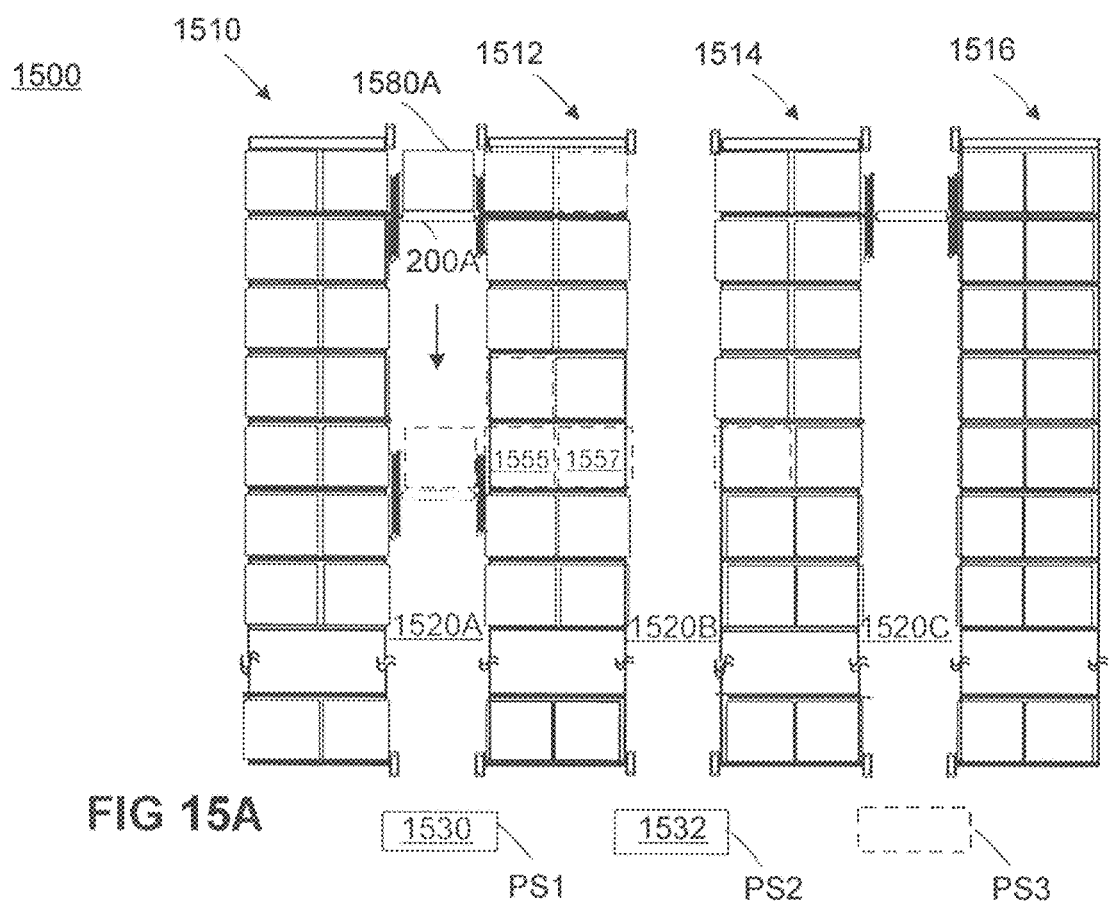
Figure 15B:
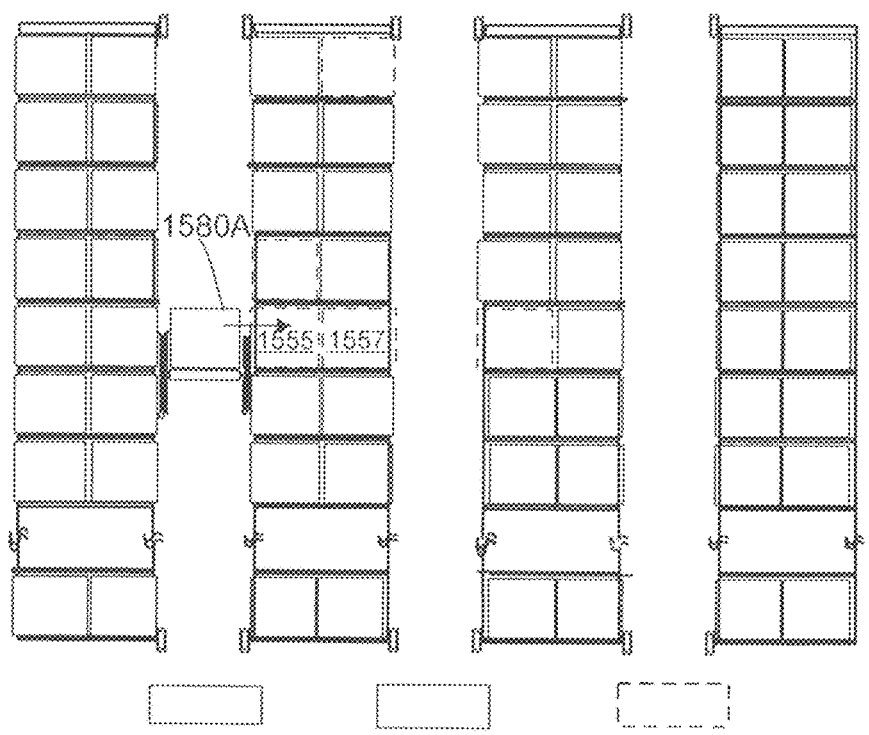
Figure 15C:
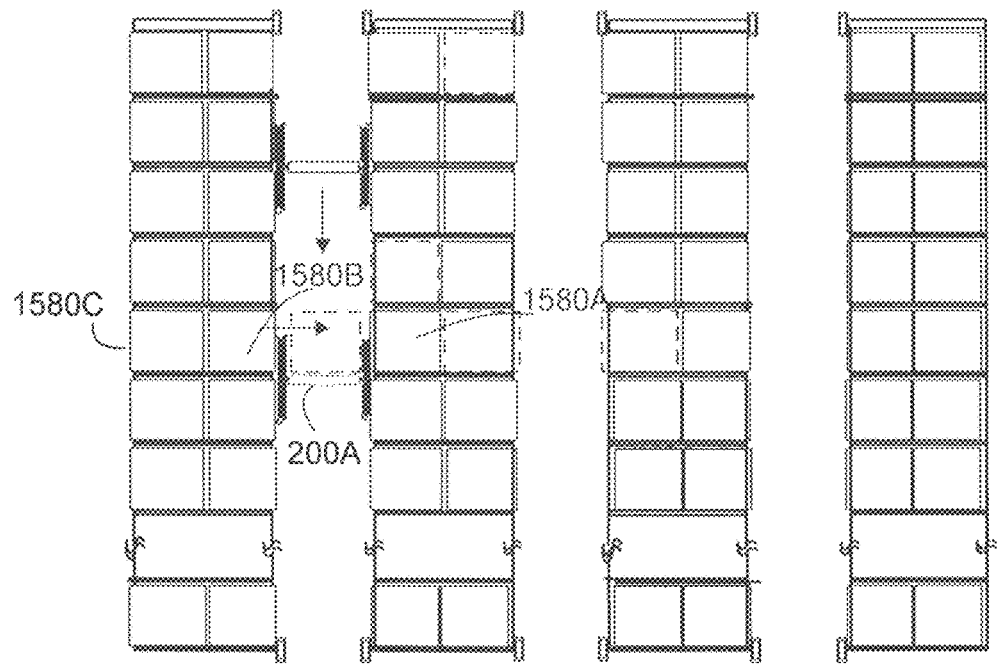
Figure 15D:
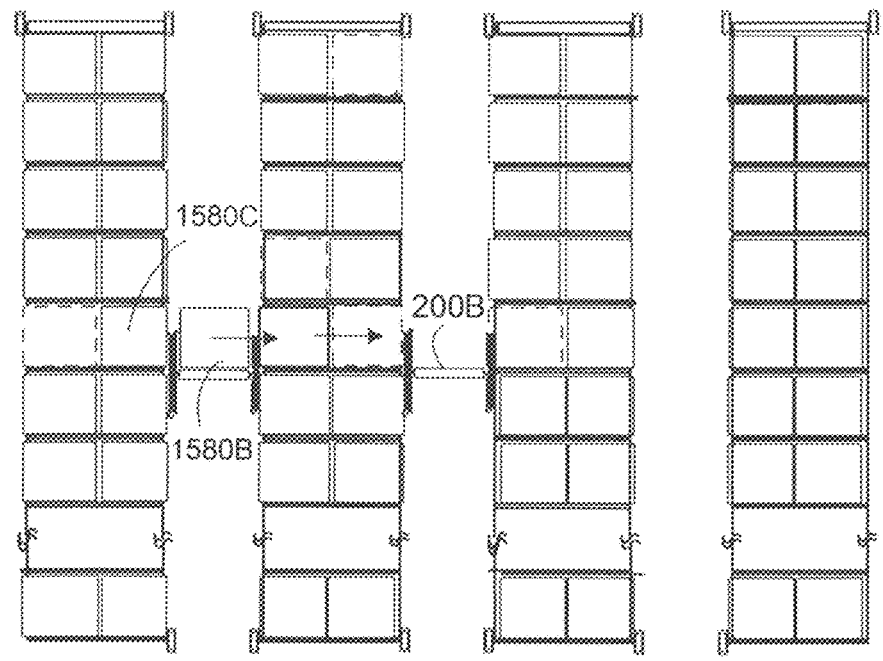
Figure 15E:
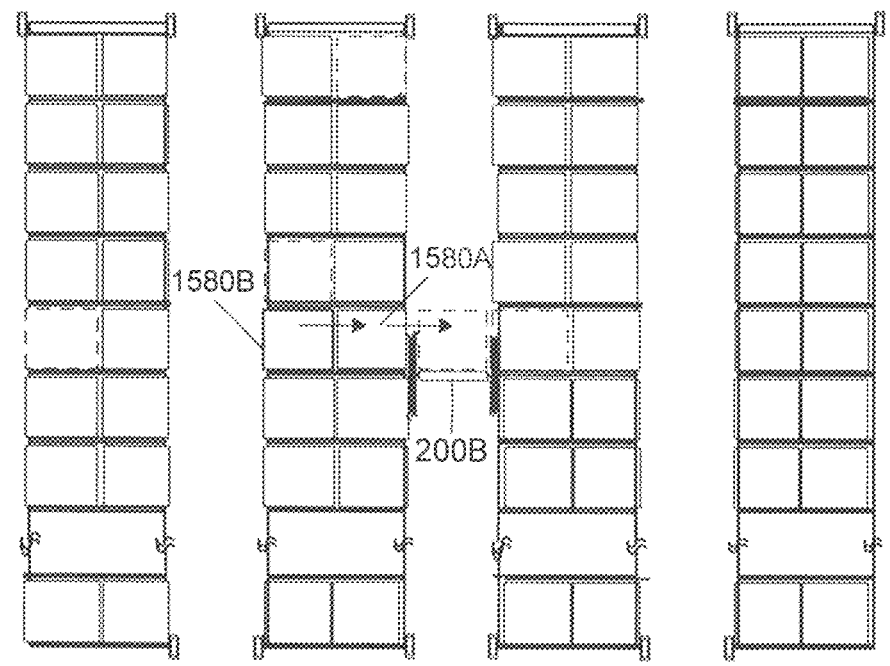
Figure 15F:
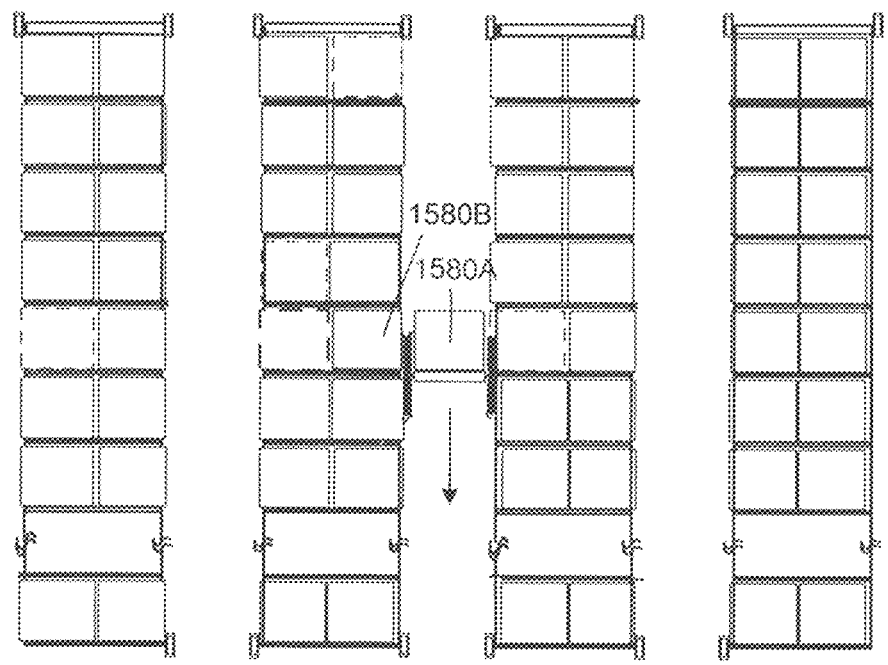
Figure 16:
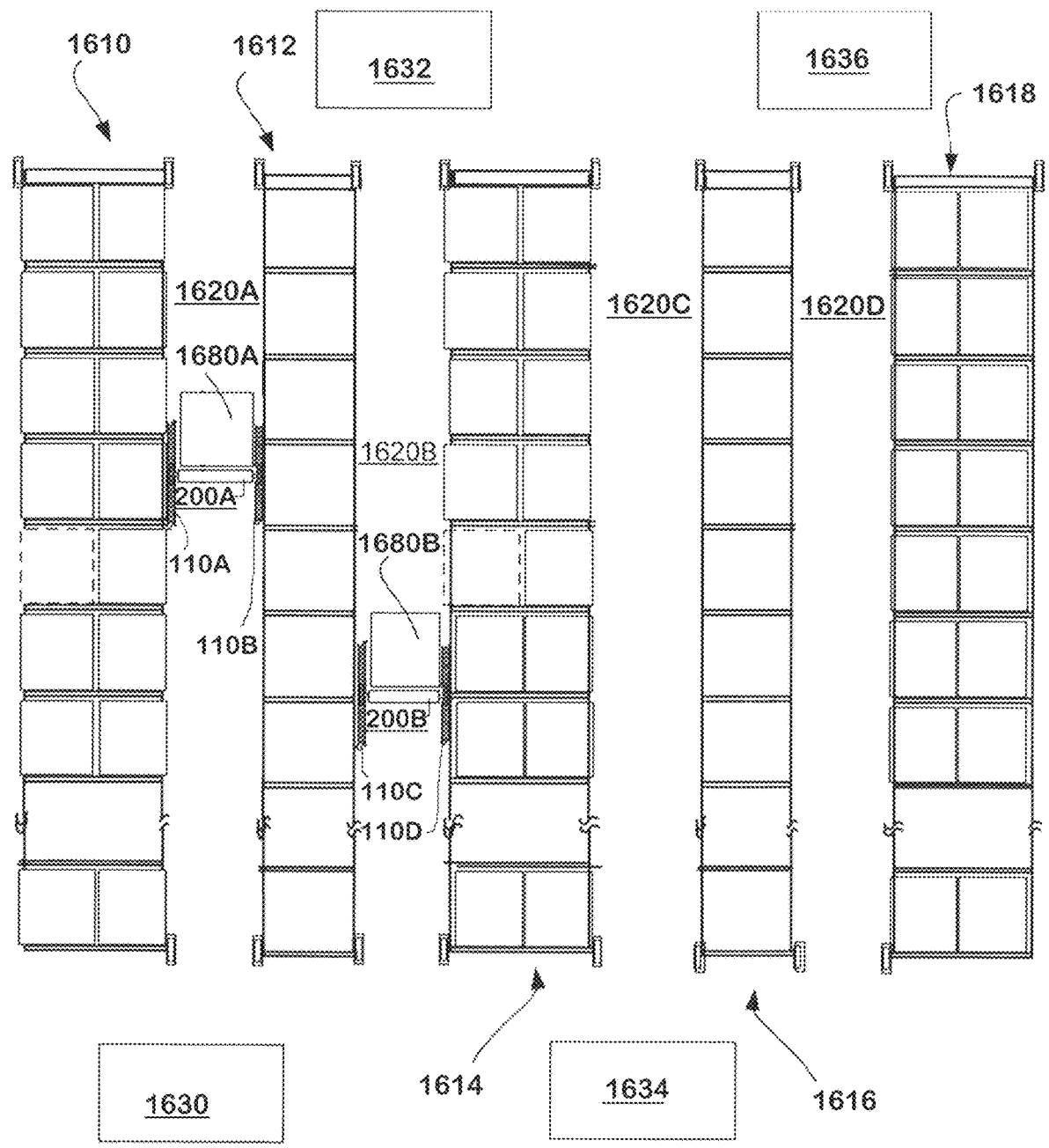

3 and a portion of the track illustrated in FIG. 2;

FIG. 8 is a side diagrammatic view of a plurality of storage locations of the apparatus illustrated in FIG. 1;

FIG. 9 is diagrammatic side view of storage containers in the storage locations of the apparatus illustrated in FIG. 1;

FIG. 10A is a diagrammatic view of the storage containers illustrated in FIG. 9, showing a step in the process of moving a storage container from one location to another;

FIG. 10B is a diagrammatic view of the storage containers illustrated in FIG. 9, showing a step in the process of moving a storage container from one location to another;

FIG. 10c is a diagrammatic view of the storage containers illustrated in FIG. 9, showing a step in the process of moving a storage container from one location to another;

FIG. 10D is a diagrammatic view of the storage containers illustrated in FIG. 9, showing a step in the process of moving a storage container from one location to another;

FIG. 10E is a diagrammatic view of the storage containers illustrated in FIG. 9, showing a step in the process of moving a storage container from one location to another;

FIG. 10F is a diagrammatic view of the storage containers illustrated in FIG. 9, showing a step in the process of moving a storage container from one location to another;

FIG. 10G is a diagrammatic view of the storage containers illustrated in FIG. 9, showing a step in the process of moving a storage container from one location to another;

FIG. 10H is a diagrammatic view of the storage containers illustrated in FIG. 9, showing a step in the process of moving a storage container from one location to another;

FIG. 11 is a fragmentary perspective view of a portion of a storage rack of the apparatus illustrated in FIG. 1;

FIG. 12 is a fragmentary perspective view of a portion of a storage rack of the apparatus illustrated in FIG. 1 including a vehicle of the apparatus; and FIG. 13 is a fragmentary side view of a releasable connection between storage containers of the apparatus illustrated in FIG. 1, in which the storage containers are connected;

FIG. 14 is a fragmentary side view of a releasable connection between storage containers of the apparatus illustrated in FIG. 1, in which the storage containers are disconnected;

FIG. 15A is a side elevational view of a multiple aisle ASR system constructed in accordance with an exemplary embodiment consistent with the present disclosure, illustrating a first storage container on a vehicle in a first aisle;

FIG. 15B is aside elevational view of the multiple aisle ASR system illustrated in FIG. 15A, illustrating the first storage container in a second position in the first aisle;

FIG. 15C is a side elevational view of the multiple aisle ASR system illustrated in FIG. 15B, illustrating the first storage container transferred to a storage location;

FIG. 15D is a side elevational view of the multiple aisle ASR system illustrated in FIG. 15C, illustrating a second storage container transferred to the storage location;

FIG. 15E is a side elevational view of the multiple aisle ASR system illustrated in FIG. 15D, illustrating the first storage container transferred aligned with a second vehicle in a second aisle;

FIG. 15F is a side elevational view of the multiple aisle ASR system illustrated in FIG. 15E, illustrating the first storage container transferred to a second vehicle in a second aisle;

FIG. 16 is a side elevational view of a multiple aisle ASR system constructed in accordance with yet another embodiment consistent with the present disclosure.

Figure 17:
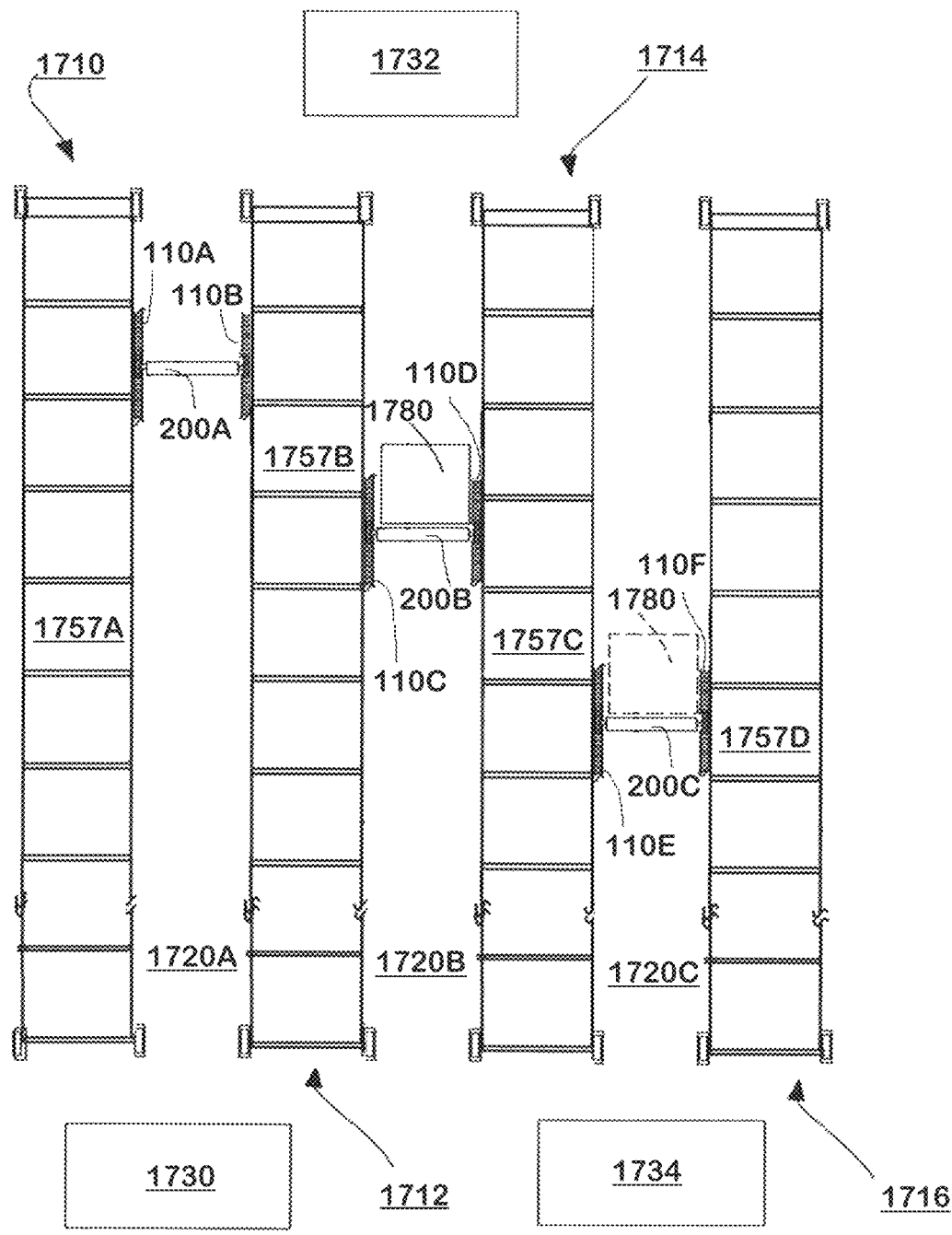

FIG. 17 is a side elevational view of a multiple aisle ASR system constructed in accordance with another embodiment consistent with the present disclosure.

DETAILED DESCRIPTION

Embodiments of the present disclosure are directed to automated storage and retrieval systems and methods in which a plurality of detachably coupled storage containers are interlocked together in seriatim to form groups of n storage containers, with each respective group being stored within a corresponding storage location of at least one array of storage locations. When one of the storage containers of an interlocked group of storage containers is to be retrieved from storage, one or more decoupling operations and, optionally, container withdrawal operation(s), are performed until the selected storage container is ready for transport to a second location (e.g., a pick station).

In-situ interlocking in accordance with some embodiments of the present disclosure permits groups of n storage containers (where n is an integer greater than 1) to be efficiently stored within adjacent racks, where each respective rack defines a corresponding array of storage locations and the storage locations of adjacent racks are separated by an aisle. Withdrawing an aisle-facing storage container from one of the storage locations of a rack causes any interlocked storage container(s) of the same group to advance toward the aisle as part of the same withdrawal operation. If the withdrawn aisle-facing storage container is a container selected for retrieval, it is decoupled from the container(s) remaining within the storage location and then transported directly to, for example, a pick station where one or more items are removed from a retrieved storage container. If the aisle-facing container withdrawn and decoupled initially is not the container selected for retrieval, it is transported to an alternate storage location (e.g., a different storage location of the same or a different array). The withdrawal and, if applicable, decoupling processes are repeated until the container selected for retrieval has been withdrawn and decoupled from any other containers still remaining in the storage location. Accordingly, complex and costly gripping structures capable of simultaneously gripping, withdrawing, reordering and/or returning multiple containers to a storage location are not required.

Referring now to the figures in general and to FIG. 1 specifically, there is shown a perspective view of an exemplary, single aisle, automated storage and retrieval (ASR) system 10 according to one or more embodiments consistent with the present disclosure. The system 10 includes a conveyor for transporting storage containers 80 between, for example, one or more storage locations and/or between a storage location and an item pick station and/or a container transfer station. An exemplary pick station is indicated generally at reference numeral 300.

In the exemplary embodiment of FIG. 1, the conveyor includes a plurality of independently movable vehicles 200 which are respectively movable along dynamically configurable paths to accommodate storage of times in and/or retrieval of items from a storage location of the ASR 10. Other non-limiting examples of conveyors suitable for use in embodiments consistent with the present disclosure include gantry structures, articulating grippers, and any other system capable of moving an individual container in three, orthogonal directions (i.e., vertically and horizontally within an aisle and toward and away from a selected storage location adjacent to the aisle).

In some embodiments consistent with the present disclosure, the storage containers 80 are dimensioned and arranged to receive items managed as inventory using ASR system 10. One or more dividers (not shown) may be positioned within some or all of the storage containers 80 to subdivide the interior space of each storage container into discrete compartments. The storage containers may have a uniform width W, height H and length L. In alternative embodiments (not shown), however, a first subset of the storage containers may have a first length $L_1$ and a second subset of the storage containers may have a second length $L_2$, which may be either greater than or less than $L_1$.

Storage Racks

The storage containers 80 are dimensioned and arranged so that they may be introduced into (and withdrawn from) a storage location selectable from among one or more array(s) of storage locations. By way of illustrative example, each of the storage rack structures 35 and 40 depicted in FIG. 1 may include a network of parallel rails or L-channels (not shown) dimensioned and arranged to define weight bearing support surfaces alignable with one or more surfaces of the storage containers 80. In such embodiments, a pushing force or pulling force exerted upon a first storage container of an interlocked group of storage containers causes all of the storage containers of an interlocked group to slide in the same direction as the applied force.

In at least one of the rack structures (e.g., rack structure 40), the storage locations 50 are dimensioned and arranged to accommodate n storage containers 80 interlocked together and placed one behind the other to form a discrete group, where n is an integer equal to or greater than two, such that the storage locations have an effective length $L_E$ of n×L. In addition, or alternatively, the effective length $L_E$ of the storage locations defined by one or both rack structure(s) may be $(r \times L_1)+(s \times L_2)$, where each of r and s have an integer value equal to or greater than one.

Figure 2A:
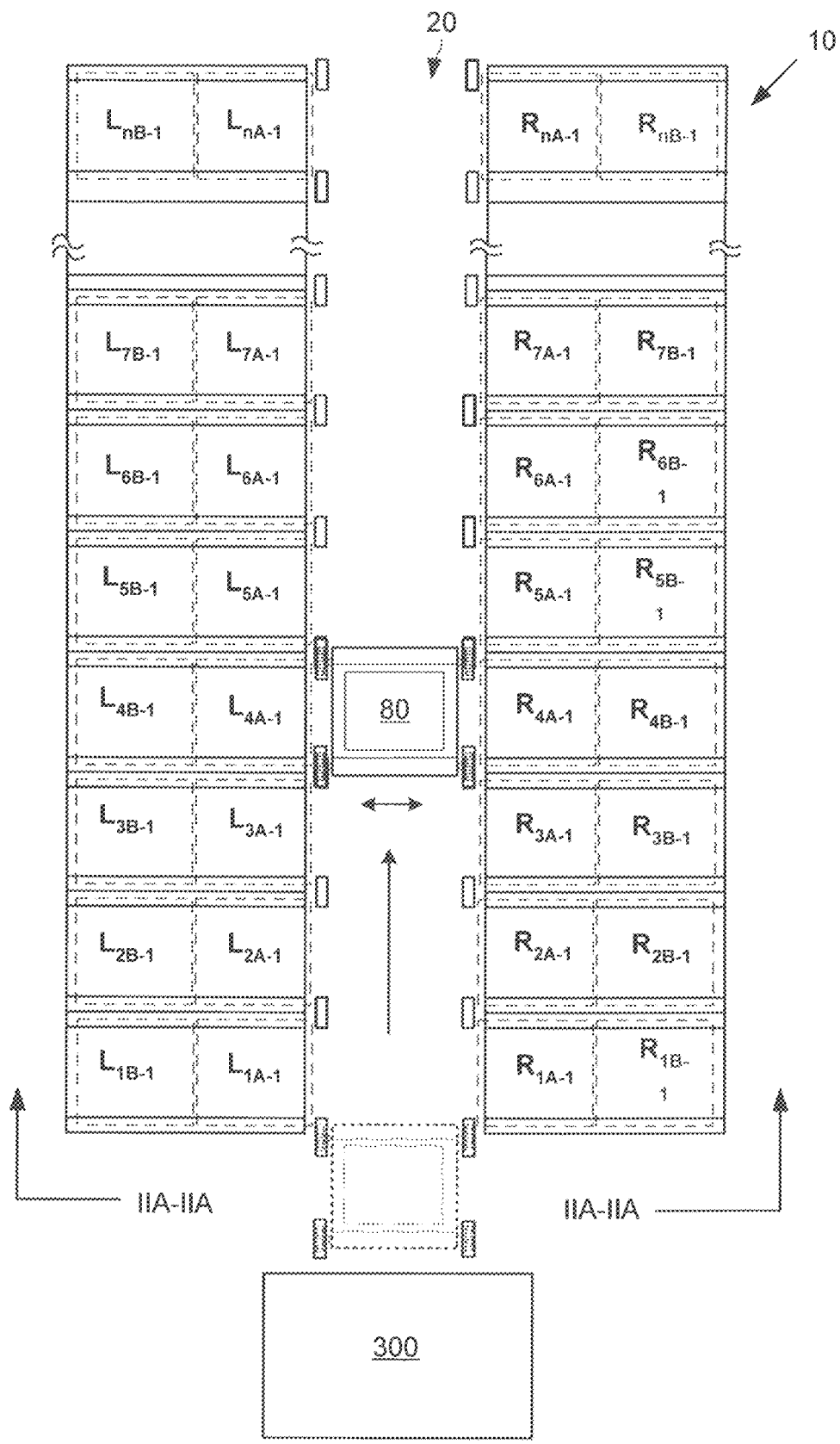
FIG. 2A is a fragmentary top view of the exemplary single-aisle ASR system of FIG. 1, taken across reference plane IIA-IIA of FIG. 1 and depicting left and right arrays of storage locations as well as the horizontal movement of an item storage container within the aisle that extends between the arrays, according to one or more embodiments.

Turning briefly to FIG. 2A, there is shown a fragmentary top view of the exemplary single-aisle ASR system of FIG. 1, taken across reference plane IIA-IIA of FIG. 1. In the exemplary embodiment of FIG. 2A, there are shown left and right arrays of storage locations separated by aisle 20, of which only the uppermost storage locations accessible from aisle 20 are shown. Each storage location of the exemplary embodiment of FIG. 2A defines two storage regions—an aisle-facing, first storage region and a distal, second storage region located directly behind the first storage region. As such, the uppermost layer of the array defined by rack structure 35 includes aisle-facing regions $L_{1A-1}$ to $L_{nA-1}$ and distal storage regions $L_{1B-1}$ to $L_{nB-1}$. Likewise, the uppermost layer of the array defined by rack structure 40 includes aisle-facing regions $R_{1A-1}$ to $R_{nA-1}$ and distal storage regions $R_{1B-1}$ to $R_{nB-1}$.

With continuing reference to FIG. 2A, it will be seen that an exemplary transport path extends from pick station 300, where items may be picked, sorted and/or transferred from or to containers 80, to a selected storage location such as the storage location comprising aisle-facing first storage region $L_{4A-1}$ and distal storage region $L_{4B-1}$ of storage rack structure 35. As will be described in greater detail shortly, FIG. 2A also depicts portions of a container/vehicle transport path which is defined, at least in part, by front and rear, vertical track segments 130 which, collectively guide the movement of vehicle 200 in a downward, vertical direction. So guided, vehicle 200 may be moved into a position adjacent to one of the aisle-facing storage regions in the fourth column of the array defined by rack structure 35 (i.e., the column that includes storage regions $L_{4A-1}$ and $L_{4B-1}$) or in the fourth column of the array defined by rack structure 40 (i.e., the column that includes storage regions $R_{4A-1}$ and $R_{4B-1}$).

Figure 2B:
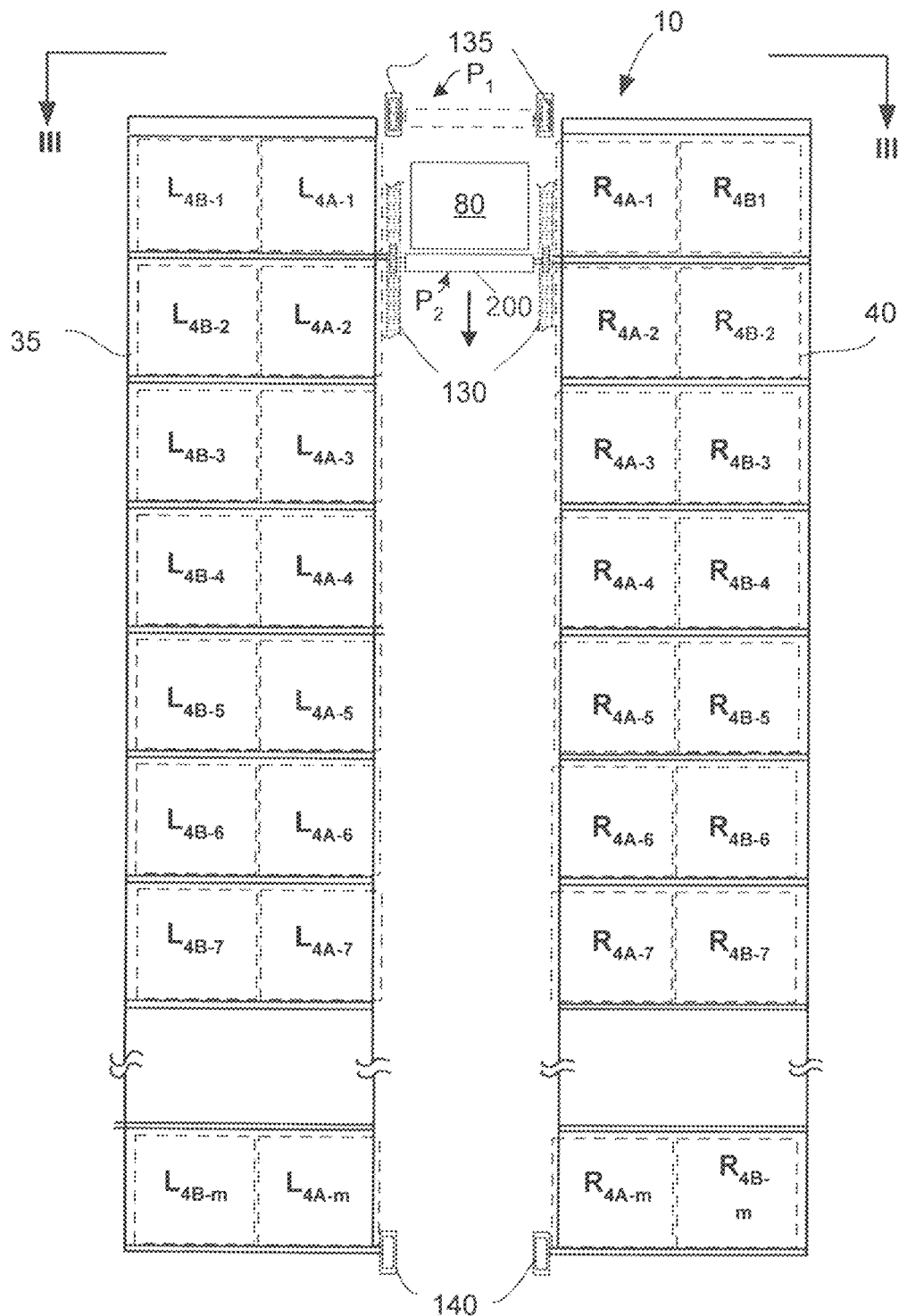
FIG. 2B, is a fragmentary side view of the single-aisle ASR embodiment depicted in FIG. 1, taken in elevation across the reference plane IIB-IIB of FIG. 1 and illustrating the vertical arrangement of storage locations in two arrays of storage locations.

Turning now to FIG. 2B, there is shown a fragmentary side view of the single-aisle ASR embodiment depicted in FIG. 1, taken in elevation across the reference plane IIB-IIB of FIG. 1 and illustrating the vertical arrangement of storage locations in each array of the storage locations defined by racks 35 and 40. FIG. 2B also depicts portions of a container/vehicle transport path which is defined, at least in part, by upper horizontal track segments 135, vertical track segments 130, and lower horizontal track segments 14 which, collectively guide the movement of vehicle 200 to, for example, a position adjacent to aisle-facing storage regions $L_{4A-1}$ and $R_{4A-1}$. In the exemplary embodiment of FIG. 2B, the empty vehicle 200 is moved from the dotted line position $P_1$ to the position $P_2$ which a container 80 is retrieved from the aisle-facing storage region $L_{4-1}$.

Conveyor Arrangement

Figure 3A:
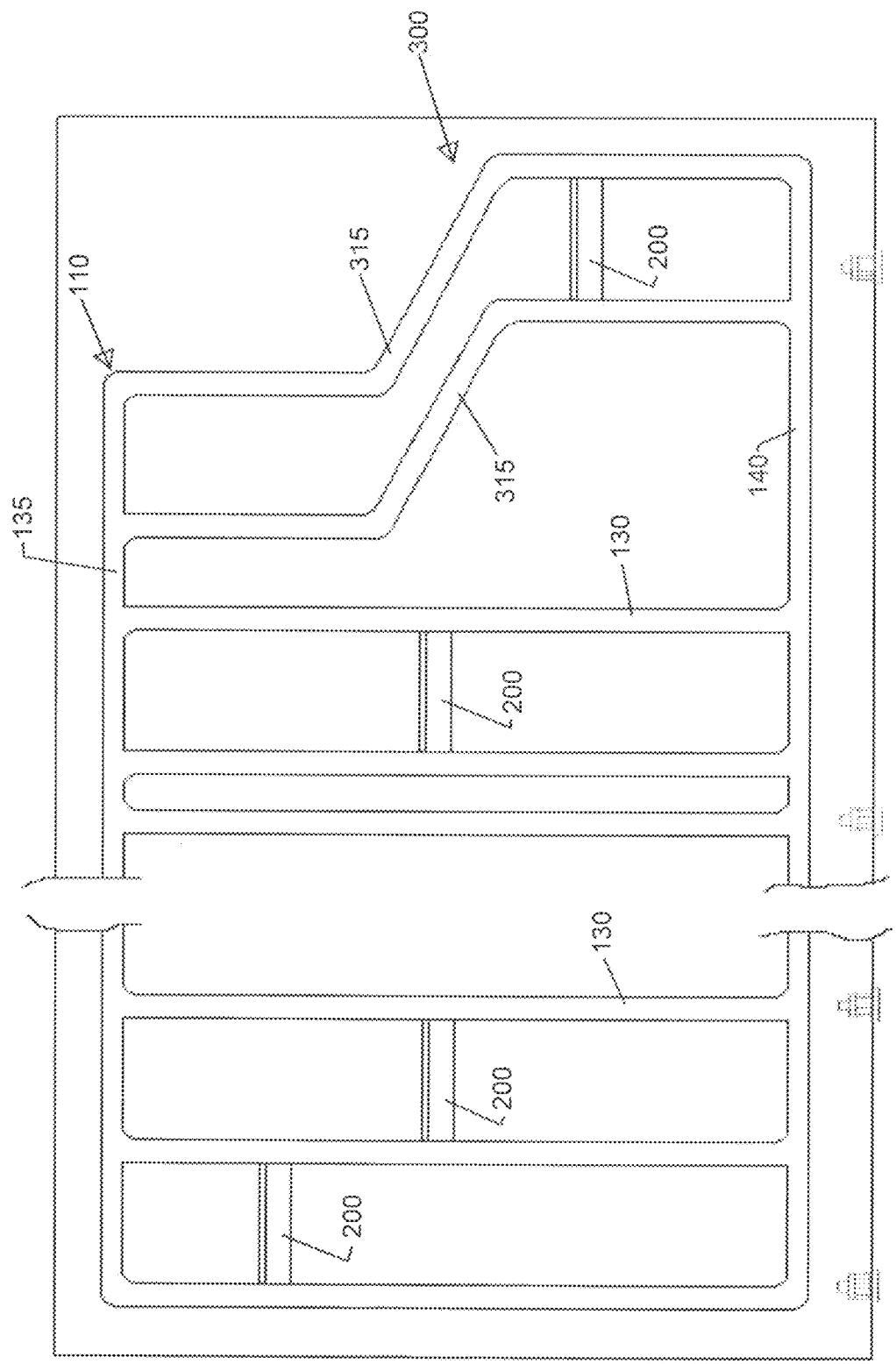
FIG. 3A is a fragmentary side view of the single-aisle ASR embodiment depicted in FIG. 1, taken in elevation across the reference plane III-III of FIG. 1 and exemplifying a network of vertical and horizontal tracks arranged along each side of the aisle in accordance with one or more embodiments.

Turning now to FIG. 3A, there is shown a fragmentary side view of the exemplary, single-aisle ASR system 10 depicted in FIG. 1, taken in elevation across the reference plane III-III and exemplifying an illustrative conveyor system that includes a track network ("track") 110 comprising vertical track segments 130, horizontal track segments 135, and transitional track segments 315 arranged along each side of the aisle 20 in accordance with one or more embodiments, gating mechanisms for dynamic configuration of transport paths, and independently movable vehicles 200.

Track

Track 110 provides one or more pathways within the aisle 20 (FIGS. 1 and 2) for the vehicles 200 to travel to storage locations in the rack structures 35 and 40. For instance, an embodiment may include a front track 115 adjacent a front rack 35 on one side of the aisle. A rear track 120 adjacent a rear rack 40 may be spaced apart from the front track 115 to form the aisle 20. The vehicles 200 may move within the aisle 20 along the track. For instance, the vehicle may be supported by one or more front wheels that engage the front track 115 and one or more rear wheels that engage the rear track 120.

As indicated above, each of storage racks 35 and 40 provides a plurality of storage locations 50 for storing containers 80 that store various items. The vehicles 200 move along the track 110 to storage locations. At a storage location 50, a vehicle can transfer a storage container 80 from the vehicle into one of the storage locations. Similarly, the vehicle can transfer a storage container 80 from one of the storage locations onto the vehicle. Additionally, the system may be configured so that the vehicle transfers a storage container 80 from the vehicle 200 to a storage location while at the same time transferring a container 80 from a different storage location onto the vehicle 200. The storage locations may be arranged as an array of locations adjacent the aisle. Additionally, as discussed further below, the racks 35, 40 may provide storage depth so that the storage containers may be stored two or more deep to increase the storage density of the storage containers 80 in the racks.

Independently Movable Vehicles

Figure 3B:
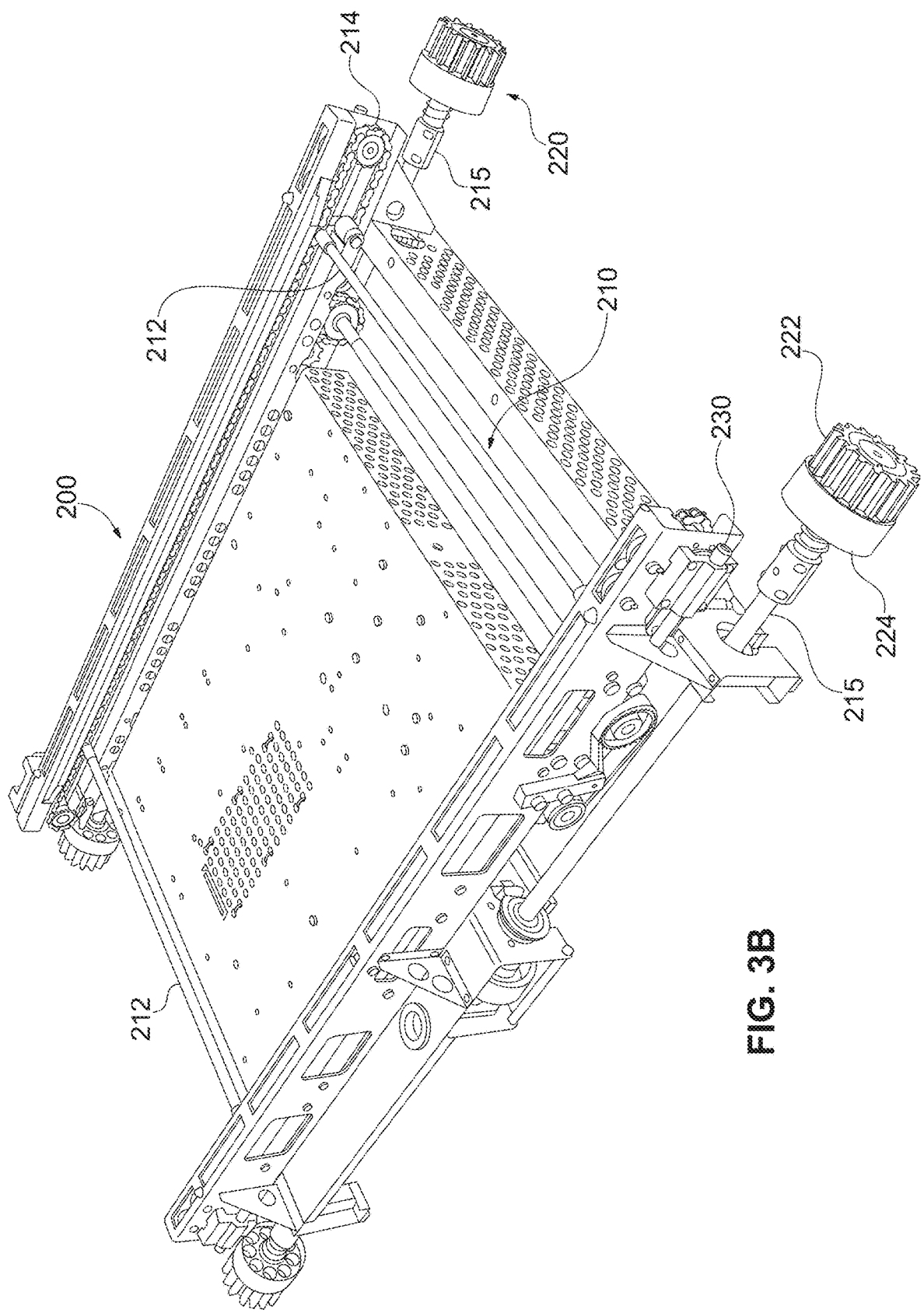
FIG. 3B is an enlarged perspective view of a vehicle dimensioned and arranged for independent movement within the aisle of the ASR embodiment depicted in FIG. 1 (e.g., along the tracks depicted in FIG. 2)

FIG. 3B is an enlarged perspective view of a vehicle dimensioned and arranged for independent movement within the aisle of the ASR embodiment depicted in FIG. 1 (e.g., along the tracks depicted in FIGS. 2A, 2B and 3A). As shown in FIG. 3B, each of the vehicles 200 includes four wheels 220: two forward wheel and two rearward wheels. The forward wheels 220 ride in the front track, while the rearward wheel ride in the rear track. It should be understood that in the discussion of the track the front and rear tracks 115, 120 are similarly configured opposing tracks that support the forward and rearward wheels 220 of the vehicles. Accordingly, a description of a portion of either the front or rear track also applies to the opposing front or rear track.

In embodiments consistent with the present disclosure, each vehicle 200 is a semi-autonomous vehicle that includes an onboard drive system and an onboard power supply. In some embodiments, each vehicle further includes a mechanism for inserting item storage containers as containers 80 into one of storage locations 50 (FIG. 1) or withdrawing an item storage container from one of the storage locations 50. As will soon be described in detail by reference to FIGS. 4-6, each vehicle may optionally include a gate actuator 230 for selectively actuating the gates 180 (FIGS. 4-6) to allow the vehicle to selectively change direction.

The vehicles 200 may incorporate any of a variety of mechanisms for loading an item onto the vehicle and discharging the item from the vehicle into one of the bins. Additionally, the loading/unloading mechanism 210 may be specifically tailored for a particular application. In the present instance, the loading/unloading mechanism 210 may comprise a displaceable element configured to engage a container stored at a storage location 190 and pull the item onto the vehicle. More specifically, in the present instance, the vehicle includes a displaceable element configured to move toward a container 80 in an occupied storage location 50.

After the displaceable element engages the container 80, the displaceable element is displaced away from an occupied storage location 50, thereby exerting a pulling force of sufficient magnitude and direction to withdraw a container from an occupied, aisle facing storage region onto the vehicle 200.y, As will be described in detail shortly, If the withdrawn container is already linked to another container within the same storage location, then a preliminary coupling operation is performed before the withdrawn container is transferred to another location (e.g., a pick station or alternate storage location of the same or a different array). Conversely, operation of the displaceable element in the reverse direction exerts a pushing force of sufficient magnitude and duration to transfer a storage container from a load bearing surface of vehicle 200 into the aisle storage location. If the aisle facing storage region of a storage location is already occupied, but the one behind it is not, then a preliminary coupling operation is performed.

In an exemplary embodiment, the loading/unloading mechanism 210 may comprise a displaceable rod or bar 212. The bar 212 may extend across the width of the vehicle 200 and both ends may be connected with drive chains that extend along the sides of the vehicle. A motor may drive the chains to selectively move the chain toward or away from storage locations. For example, as the vehicle approaches a storage location to retrieve a container 80, the chain may drive the rod 212 toward the storage location so that the bar engages a groove or notch 88 in the bottom of the container 80. The chain then reverses so that the bar 212 moves away from the storage location 50. Since the bar is engaged in the notch 88 in the container, as the bar moves away from the storage location, the bar 212 pulls the container onto the vehicle. In this way, the loading/unloading mechanism 210 may be operable to retrieve items from a storage location. Similarly, to store a container in a storage location 50, the chain of the loading/unloading mechanism 210 drives the bar 212 toward the storage location until the container is in the aisle-facing region of a storage location. The vehicle may then move downwardly to disengage the bar from the container 80, thereby releasing the container. Alternatively, the loading/unloading mechanism may be configured so that the bar 212 is driven downwardly, out of engagement with the notch 88.

Additionally, since the system 10 includes an array of storage locations 50 adjacent the front side of the track 110 and a second array of storage locations adjacent the rear side of the track, the loading/unloading mechanism 210 is operable to retrieve and store containers in the forward array and the rearward array. Specifically, as shown in FIG. 3B, the loading/unloading mechanism 210 includes two bars spaced apart from one another. One bar is operable to engage containers in the forward array, while the second bar is operable to engage containers in the rearward array of storage locations.

The vehicle 200 may include four wheels 220 that are used to transport the vehicle along the track 110. The wheels 220 may be mounted onto two parallel spaced apart axles 215, so that two of the wheels are disposed along the forward edge of the vehicle and two of the wheels are disposed along the rearward edge of the vehicle.

The vehicle may include an onboard motor for driving the wheels 220. More specifically, the drive motor may be operatively connected with the axles to rotate the axles 215, which in turn rotates the gears 222 of the wheels. The drive system for the vehicle may be configured to synchronously drive the vehicle along the track. In the present instance, the drive system is configured so that each gear is driven in a synchronous manner.

The vehicle 200 may be powered by an external power supply, such as a contact along the rail that provides the electric power needed to drive the vehicle. However, in the present instance, the vehicle includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The vehicle includes one or more contacts for recharging the power source. In the present instance, the vehicle includes a plurality of brushes, such as copper brushes that are spring-loaded so that the brushes are biased outwardly. The brushes cooperate with a charging rail to recharge the power source.

Each vehicle may include a load sensor for detecting that a container is loaded onto the vehicle. The sensor(s) may be used to detect whether the item is properly positioned on the vehicle. For instance, the load sensor may include a force detector detecting a weight change or an infrared sensor detecting the presence of an item.

The vehicle may further include a processor for controlling the operation of the vehicle in response to signals received from a central processor of the system. Additionally, the vehicle may include a wireless transceiver so that the vehicle can continuously communicate with the central processor as it travels along the track. Alternatively, in some applications, it may be desirable to incorporate a plurality of sensors or indicators positioned along the track. The vehicle may include a reader for sensing the sensor signals and/or the indicators, as well as a central processor for controlling the operation of the vehicle in response to the sensors or indicators.

Gating Mechanisms

Figure 4:
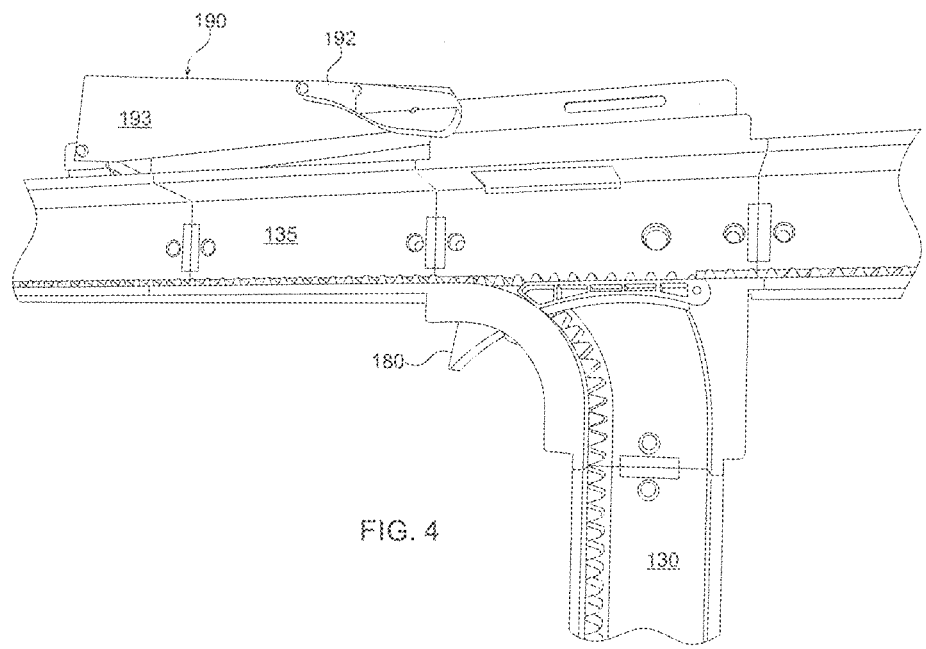
FIG. 4 is an enlarged perspective view of a gate of the track arrangement illustrated in FIG. 2.
Figure 5:
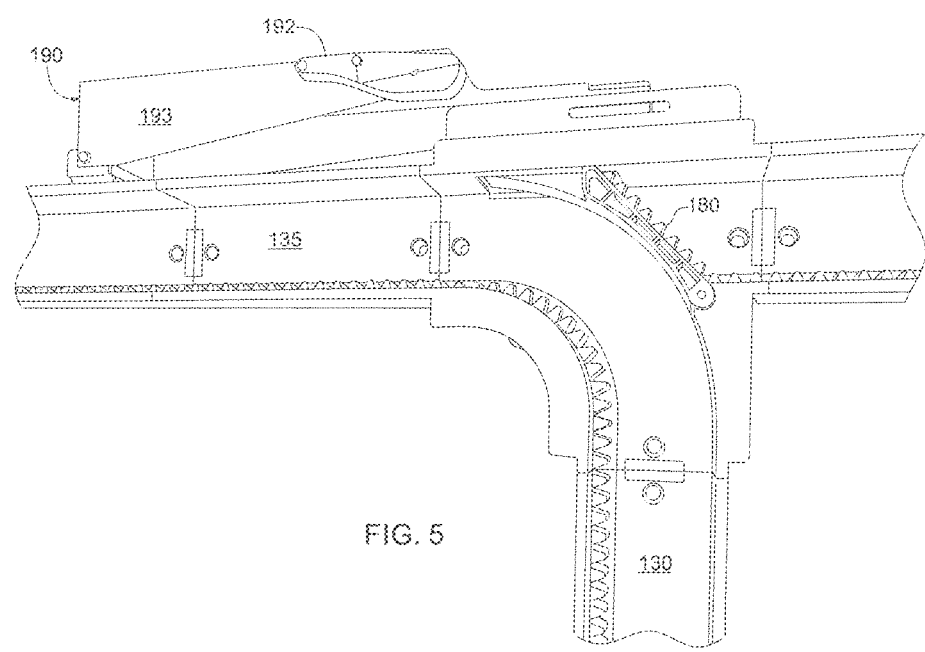
FIG. 5 is an enlarged perspective view of a gate of the track arrangement illustrated in FIG. 2.
Figure 6:
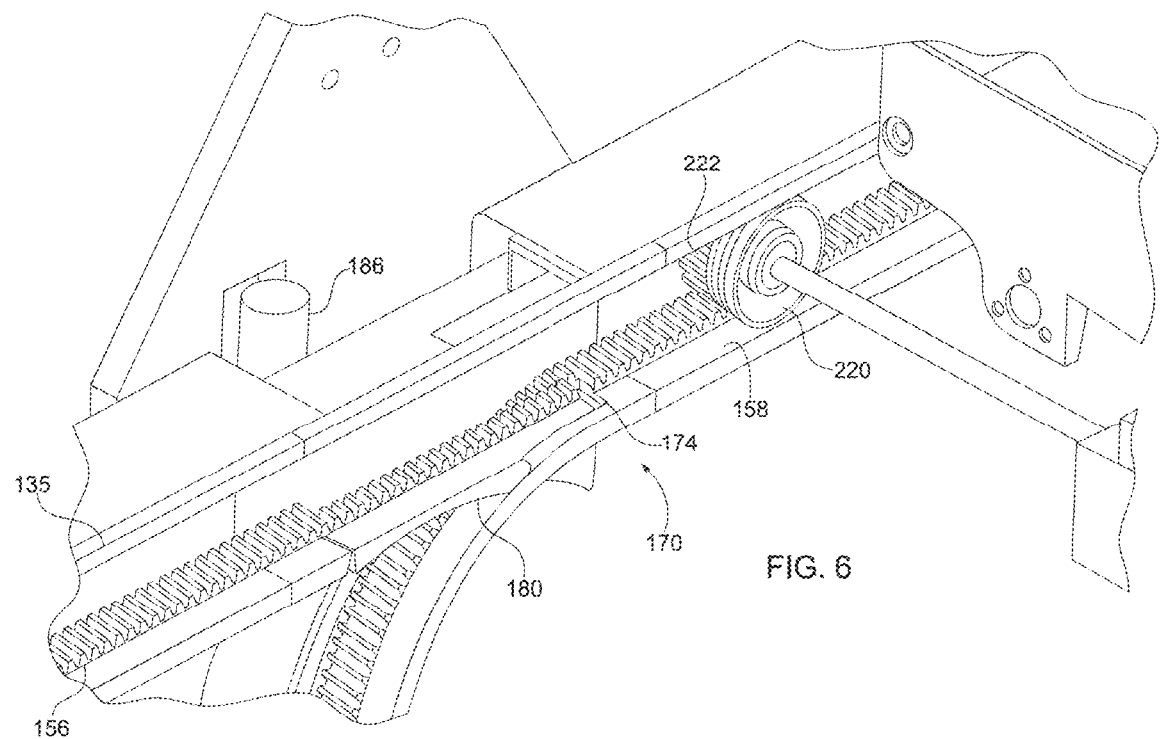
FIG. 6 is an enlarged perspective view of a gate of the track illustrated in FIG. 2.
Figure 7:
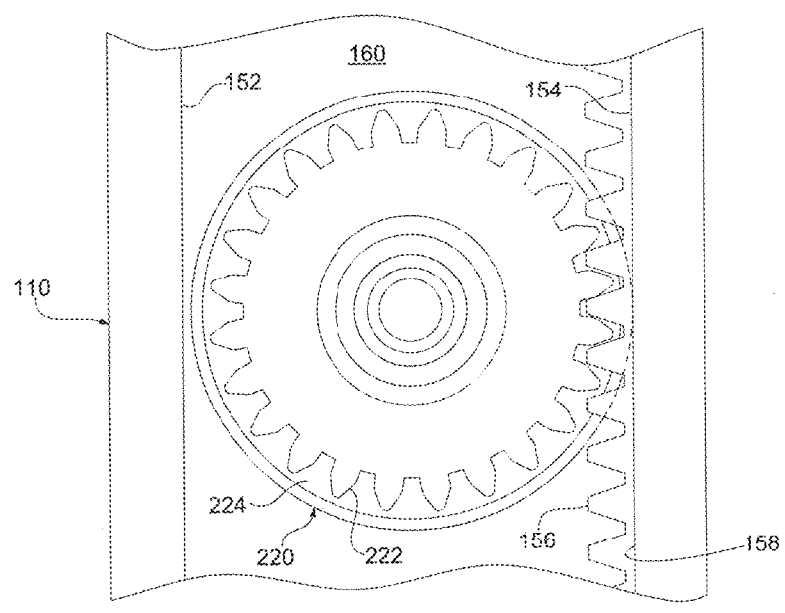
FIG. 7 is an enlarged fragmentary view of a wheel of the vehicle illustrated in FIG. 3 and a portion of the track illustrated in FIG. 2.

FIGS. 4-6 are enlarged perspective views respectively depicting gates of the track arrangement 110 of FIG. 3A, while FIG. 7 is an enlarged fragmentary view of a wheel of the vehicle illustrated in FIG. 3B and a portion of the track illustrated in FIG. 3A. Referring concurrently to FIGS. 4-7, the details of a track 110 dynamically configurable to define a transport path for conveying containers to or from a storage location will be described in greater detail. As noted above, however, it should be appreciated that the illustrated track is merely an exemplary track that can be used with the system. The precise configuration may vary according to the application and as noted above, the conveyor system may not include the track or independently movable vehicles as depicted in the illustrative embodiments.

The track 110 may include an outer wall 152 and an inner wall 154 that is spaced apart from the outer wall and parallel to the outer wall. The track also may have a back wall 160 extending between the inner and outer walls. As can be seen in FIG. 7, the outer and inner walls 152, 154 and the back wall form a channel. The wheels 220 of the vehicle ride in this channel. The track may include both a drive surface 156 and a guide surface 158. The drive surface positively engages the vehicles to enable the vehicle to travel along the track. The guide surface 158 guides the vehicle, maintaining the vehicle in operative engagement with the drive surface 156. In the present instance, the drive surface is formed of a series of teeth, forming a rack that engages the wheels of the vehicles as described further below. The guide surface 158 is a generally flat surface adjacent the rack 156. The rack 156 extends approximately halfway across the track and the guide surface 158 extends across the other half of the track. As shown in FIGS. 4-7, the rack 156 may be formed on the inner wall 154 of the track. The opposing outer wall 152 may be a generally flat surface parallel to the guide surface 158 of the inner wall.

As described above, the track 110 may include a plurality of vertical segments or legs extending between the horizontal upper and lower rails 135, 140. An intersection 170 may be formed at each section of the track at which one of the vertical legs intersects one of the horizontal legs. Each intersection may include an inner branch 172 that is curved and an outer branch 176 that is generally straight. The intersections of the vertical legs with the lower rail incorporate similar intersections, except the intersections are reversed.

Each intersection 170 may include a pivotable gate 180 that may have a smooth curved inner race and a flat outer race that has teeth that correspond to the teeth of the drive surface 156 for the track. The gate 180 may pivot between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Accordingly, in the closed position, the gate is pivoted downwardly so that the outer race 184 of the gate aligns with the drive surface 156. In this position, the gate blocks the vehicle from turning down the curved portion, so that the vehicle continues straight through the intersection. In contrast, as illustrated n FIG. 6, when the gate is pivoted into the open position, the gate blocks the vehicle from going straight through the intersection. Instead, the curved inner race 182 of the gate aligns with the curved surface of the inner branch 172 and the vehicle turns through the intersection. In other words, when the gate is closed, a vehicle goes straight through the intersection along either the upper rail 130 or the lower rail 140, depending on the location of the intersection. When the gate is opened, the gate directs the vehicle from either a vertical rail to a horizontal rail or from a horizontal rail to a vertical rail, depending on the location of the intersection.

In the foregoing description, the gates allow one of the vehicles to either continue in the same direction (e.g. horizontally) or turn in one direction (e.g. vertically). However, in some applications, the system may include more than two horizontal rails that intersect the vertical columns. In such a configuration, it may be desirable to include a different rail that allows the vehicles to turn in more than one direction. For instance, if a vehicle is traveling down a column, the gate may allow the vehicle to turn either left or right down a horizontal rail, or travel straight through along the vertical column. Additionally, in some instances, the vehicles may travel upwardly Since the system 10 includes a number of vehicles 200, the positioning of the vehicles is controlled to ensure that the different vehicles do not crash into each other. In one embodiment, the system 10 uses a central controller that tracks the position of each vehicle 200 and provides control signals to each vehicle to control the progress of the vehicles along the track. The central controller may also control operation of the various elements along the track, such as the gates 180. Alternatively, the gates may be actuated by the vehicles 200. For instance, referring to FIG. 4-5, the gates 180 may include a passive actuator 190 that responds to an actuator 230 on the vehicles. If the actuator on the vehicle engages the gate actuator 190 then the gate moves from a first position to a second position. For instance, as shown in FIG. 4, the gate is in a first position so that the vehicle will remain along the horizontal rail 135. If the gate actuator 230 on the vehicle 200 engages the actuator 190 on the gate, the gate 180 will pivot upwardly into a second position so that the vehicle will turn and move downwardly along the vertical rail 130.

The actuators 190 on the gates may be moveable actuation surfaces 192 connected to the gate by a linkage. For instance, the actuation surface 192 may be mounted on a pivotable arm 193. To actuate the gate and move it from the first position to the second position, the gate actuator 230 on the vehicle contacts the actuation surface 192. The actuation surface is angled similar to a ramp, so that as the vehicle advances toward the gate, the gate actuator on the vehicle engages the actuation surface and progressively displaces the arm 193 upwardly. The arm 193 may be connected to the gate 180 by a linkage. Accordingly, when the arm 193 pivots, the gate pivots as well. In this way, the actuator 230 on the vehicle engages the actuator on the gate to move the gate from the first position to the second position as shown in FIGS. 4-5. After the vehicle 200 passes an open gate, such as shown in FIG. 5, the gate may return to the closed position shown in FIG. 4. The gate may close automatically, such as by a biasing element or the weight of the gate and/or actuator.

Referring now to FIGS. 8-12, the insertion of containers into the storage locations 50 of storage racks 35, 40, and/or their withdrawal for relocation, for example, to an alternate storage location or to a pick station, will now be described in greater detail. The storage locations 50 can be any of a variety of configurations. For instance, the simplest configuration is a shelf for supporting the items or the container holding the items. Similarly, the storage locations 50 may include one or more brackets that cooperate with the storage mechanism to support the storage mechanism in the storage location.

As shown in FIGS. 8 and 11-12, the rack 35 may include a plurality of vertical supports, such as vertical beams, interconnected with a plurality of horizontal supports, such as horizontal beams. In the present instance, the track 110 may form part of the vertical and horizontal support beams. For instance, the rack 35 may comprise an array of columns, with each column formed by a plurality of support. Each column may be defined by two front vertical support beams and two rear vertical support beams. As shown in FIG. 11, the front vertical beams may comprise the vertical legs 130 of the track. Each column may include a plurality of storage areas 50. In particular, each column is separated into a plurality of aisle facing, first storage regions (or cells) and a plurality of distal, second storage regions (or cells) Each cell includes a support element for supporting a container to that the container can be stored in the cell. The support elements may be any of a variety of elements for supporting a container in the storage location. For instance, each storage location may include a shelf or other horizontal support onto which a container may be placed. For instance, as shown in FIGS. 8 and 11-12, the rack 35 may include a plurality of brackets, such as L-channels 52 attached to the vertical supports 130. The brackets 52 may extend substantially the depth of each storage location 50. In this way, each storage location 50 may be defined as the area extending between adjacent vertical supports and extending upwardly from adjacent a pair of horizontal supports elements 52 to a point adjacent an upper pair of horizontal supports or the top of the rack.

Additionally, as shown in FIG. 11, each storage location 50 may be configured so that the containers 80 project inwardly toward the aisle so that the inner end of the container projects inwardly beyond the vertical supports. In other words, the containers 80 may be stored in the storage locations 50 so that the inner edge of the container (with respect to the aisle 20) overhands into the aisle.

Referring now to FIG. 9, the racks may be configured so that one or more of the storage locations 50 is deep enough to accommodate a plurality of containers. For example, one or more of the storage locations are at least approximately twice as deep as the storage containers 80 so that two storage containers can be stored, with one storage container stored behind the other storage container. It should be understood that the storage locations may be configured to accommodate any number of storage containers. For instance, the racks 35, 40 may be configured so that one or more of the storage locations can accommodate three containers, so that the containers are three-deep. In such an embodiment, the storage location 50 is approximately three times as deep as the length of the storage container 80. Similarly, the depth of the rack can be increased to be approximately "n" times the length of the storage containers to accommodate "n" storage containers stored "n" deep, wherein "n" is an integer.

In the exemplary arrangement of FIG. 9, the system is illustrated in connection with an arrangement for storing containers in a "n" deep arrangement, in which "n"=2. Although the apparatus may include only a single rack on one side, in FIG. 9, the system is illustrated with two racks, front rack 35 and rear rack 40. Additionally, each rack is illustrated as being configured to accommodate containers in a two-deep arrangement. However, it should be understand that the racks 35, 40 do not need to be configured to accommodate the same number of containers. For instance, the front rack may be configured as a two-deep rack and the rear rack 40 may be configured as a single deep rack.

In the following discussion, the storage locations will be described relative to the arrangement illustrated in FIGS. 8-9. Each storage location 50 includes a first (aisle facing or inner) storage region 55 and a second (outer) storage region 57. Each of the inner and outer storage regions 55, 57 is configured to accommodate a container 80. The inner storage regions 55 are adjacent the aisle 20. The outer storage regions 57 are behind the inner storage regions 55, so that the inner storage location separates the outer storage location from the aisle 20 and the vehicle 200. In the present instance, the inner storage region 55 has a depth that is approximately the same as the length of a container 80. Similarly, the outer storage region 57 has a depth that is approximately the same as the length of the container 80. The outer storage regions 57 may be considered remote or distal storage regions because they are separated from the aisle by an inner storage region. In a system having a depth of greater than two, the remote regions include storage regions that are separated from the aisle by an inner storage region and one or more outer storage regions.

As discussed previously, embodiments of an ASR system consistent with the present disclosure may include a plurality of vehicles 200 that are conveyed to the storage locations to transfer items to and from the storage locations. In particular, the vehicles 200 may include a loading/unloading mechanism to transfer items into a storage location 50 or withdraw a container from the storage location. In an embodiment in which the storage containers are stored two or more deep, the system is configured so that the vehicles are able to retrieve containers stored in one of the remote storage regions of a storage location. For instance, each vehicle may include a loading element that extends outwardly to a remote storage region to engage a storage container in a remote storage region to move the container to an inner storage region and/or to load the container onto the vehicle from the remote storage region. Alternatively, a separate mechanism may be utilized to move containers from a remote storage region to an inner storage region. For instance, the rack may include a drive mechanism operable to drive a container toward the aisle from a remote storage location. The drive mechanism may be separately powered or may interact with a drive mechanism from one of the vehicles. Yet another alternative is to interconnect a container in a remote storage region with an adjacent container such that displacing one of the containers displaces both containers. For instance, a container in a remote storage region may be releasably connected with a container in an inner storage region. When the container in the inner storage region is moved toward the aisle 20, the container in the remote storage region is displaced toward the inner storage region.

Referring now to FIGS. 11-14, the storage containers 80 are configured to connect with adjacent containers. In particular, the storage containers are configured to releasably connect with one or more adjacent containers. For instance, as shown in FIG. 13, a releasable connector 90 connects two adjacent containers 80A, 80B. The releasable connector selectively connects the two containers. In this way, displacing container 80A horizontally also displaces container 80B. Additionally, the releasable connector 90 may inhibit relative motion in one direction, while allowing relative motion in a second or transverse direction. For example, the connection may connect containers 80A and 80B so that horizontal displacement of one container also displaces the other container. At the same time the releasable connector may be configured to allow vertical displacement of one container relative to the other. In the embodiment illustrated in FIGS. 11 and 13-14, the releasable connector 90 is configured to permit relative vertical displacement to connect or disconnect two adjacent containers as discussed further below.

In the following discussion, the details of an exemplary storage container 80 are provided. The container 80 may be similar to a carton or box without a lid, so that an operator can easily reach into the container to retrieve an item at the picking station. Although the present system is described as using containers, it should be understood that any of a variety of storage mechanisms can be used, such as pallets or similar platforms. Accordingly, in the following discussion, the term container is intended to include items intended to store and/or support items, including, but not limited to a pallet, platform, tray, carton, box, receptacle or similar structure.

The storage container 80 may be rectangular prism having a generally planar bottom 83. The bottom 83 is substantially horizontal, forming a platform for receiving items. The container may also include a plurality of generally vertical walls extending upwardly from the bottom 83. For instance, the container 80 may include generally parallel side walls 82. The container may include a forward wall 84 that projects upwardly from the bottom 83. The front face may extend between side walls 82 to connect the side walls. Additionally, the container may include a rear wall 86 that projects upwardly from the bottom. The rear wall 86 may be generally parallel with the front wall 84. The rear wall 86 may also extend between the side walls 82 to connect the side walls. Accordingly, the walls (82,83,84,86) of the container 80 define an interior space in which items can be stored.

The containers 80 may include one or more elements configured to cooperate with the vehicles to transfer the containers onto or off of the vehicles 200. For instance, the containers may include a hook, detent, socket, or other physical structure configured to cooperate with the vehicles. In the present instance, the containers may include a retention slot or groove 88 configured to cooperate with a loading/unloading element 212 of the vehicles. The retention groove 88 may be formed in the underside of the container 80, below the bottom 83. The retention groove 88 may be spaced rearwardly from the front face 84 of the container as shown in FIGS. 11 and 13. The retention groove 88 may extend substantially the entire width of the container. The groove may also have open ends on both sides 82 as shown in FIGS. 11 and 13 so that the groove is a through slot. As shown in FIG. 13, the groove may have a depth that is deeper than the thickness of the loading/unloading element 212 of the vehicle 200 so that the loading/unloading element remains nested within the groove to drive the container inwardly or outwardly when the loading/unloading element is displaced horizontally. The container 80 may also include a second groove or slot 88 adjacent the rearward wall 86. The second groove may be configured substantially similarly to the first wall and may be formed adjacent the rearward wall, spaced forwardly from the rearward wall 86.

Referring to FIGS. 13-14, a releasable connector 90 is illustrated for releasably connecting adjacent containers 80A, 80B. The connector 90 may facilitate displacement of one of the containers from a remote storage location 57 to an inner storage location 55. The releasable connector 90 may be cooperating hooks or latches. For instance, the releasable connector 90 may be formed of a pair of cooperable connectors 92B, 96A. A forward connector 92 may be connected with the forward end 84 of the container 80 and a rearward connector 96 may be connected with the rearward end of the container 80. In this way, the forward connector 92B of a first container 80B is releasably connectable with the rearward connector 96A of a second container 80A to connect the two containers. In one embodiment, the forward connector 92 is a hook in the form of a tongue extending downwardly generally vertically (see 92B in FIG. 14). The forward connector 92 projects downwardly from a recess adjacent the forward end of the container. In the present instance, the forward connector is an L-shaped bracket. The L-shaped bracket may have a body portion rigidly and fixedly connected with the bottom of the container. For example, the body portion of the forward connector 92 may extend substantially horizontally and may be affixed to the container by a fastener extending through the connector 92 and into the container. The tongue 94 of the forward connector may project transverse the body portion so that the tongue projects downwardly to form a vertical hook or flange that engages the second connector 96. As shown in FIG. 13, the forward connector may be connected to the container forwardly of the groove 88 used to engage the loading/unloading mechanism 212 of the vehicle.

The rearward connector 96 may be a second hook that cooperates with the first hook 92. The rearward connector 96 may project rearwardly from the rearward end of the container 80. In the present instance, the second connector 96 incorporates a hook or flange that projects vertically upwardly. Specifically, the second connector 96 may comprise a groove or channel 98 configured to receive the tongue 94 of the first connector 92. The channel 98 may be connected to a rearward end 86 of the container 80 so that the channel projects rearwardly from the rearward end. The second connector may have a body portion rigidly and fixedly connected with the bottom of the container. For example, the body portion of the rear connector 96 may be a generally flat portion extending substantially horizontally and may be affixed to the container by a fastener extending through the connector 96 and into the container.

As shown in FIG. 13, the tongue 94B of the forward connector 92B of a first container 80B is inserted into the slot 98A of the rearward connector 96A of the second container 80A to connect the first and second containers. As discussed further below, the connection between the two containers allows the containers to move together when one of the containers is displaced. In this way, pulling a first container from an inner storage location onto a vehicle pulls a connected container from a remote storage location toward an inner storage location.

Pick Station

As described previously, an ASR system constructed according to embodiments consistent with the present disclosure, as system 10 of FIG. 1, may be configured so that the vehicles 200 retrieve items from the storage locations 50 and transport the items to the pick station 300. Returning to FIGS. 1, 2A, and 2B, the pick station 300 will be described in greater detail.

In one mode of operation, system 10 is used to retrieve items needed to fill an order. The order may be an internal order, such as parts needed in a manufacturing process in a different department, or the order may be a customer order that is to be filled and shipped to the customer. Either way, the system automatically retrieves the items from the storage areas and delivers the items to the picking station so that an operator can pick the required number of an item from a container. After the item is picked from a container, the vehicle advances so that the next item required for the order is advanced. The system continues in this manner so that the operator can pick all of the items needed for an order.

In the present instance, the pick station 300 is positioned at one end of the array of storage locations. However, it may be desirable to incorporate multiple pick stations positioned along the track 110. For instance, a second pick station can be positioned along the opposite end of the array of storage locations. Alternatively, multiple pick stations can be provided at one end. For instance, a second pick station may be positioned above a first pick station at one end of the aisle.

The pick station 300 may be configured so that the vehicle travels upwardly to present the contents to the operator so that the operator can more easily retrieve items from the container 80. Referring to FIGS. 1-2, at the picking station the track includes a curved section 315 that bends upwardly and away from the operator. In this way, the vehicle moves upwardly and then stops at a height that facilitates the operator removing items from the container. After the operator removes items from the container, the vehicle moves laterally away from the operator and the vertically to the upper horizontal rail 135.

The system can be configured so that the vehicles tilt at the pick station 300 thereby making it easier for the operator to retrieve items from the container. For instance, as the vehicle approaches the pick station, the controller may control the vehicle so that the rearward set of wheels continue to drive after the forward set of wheel stop. This raises the rearward edge of the vehicle (from the perspective of the operator). After the operator picks the items from the container, the forward set of wheels (relative to the operator) drive first, thereby level off the vehicle. Once leveled, the four wheels drive synchronously.

Although the vehicles may be tilted by controlling operation of the vehicles, if the wheels of the vehicles positively engage drive elements in the track, such as the toothed wheels 220 that mesh with teeth in the track as described above, the wheels 220 may bind if the rear wheels are driven at a different rate than the forward wheels. Accordingly, the track system may be modified so that the track moves to tilt the container toward the operator.

With continued reference to FIGS. 1 and 2, the details of the track system in the picking station 300 will be described in greater detail. At the end of the columns of storage locations, the track curves outwardly away from the vertical columns of the system to form the curved, transitional track segments 315 of the pick station 300. The track sections of the pick station include parallel forward track sections that support and guide the forward axle 215 of the vehicles 200 and parallel rearward track sections that support and guide the rear axle 215 of the vehicles. The forward track sections extend vertically upwardly and then curve back toward the vertical columns of storage locations. The rearward track sections are substantially parallel to the forward track sections and curve substantially similarly to the forward track sections. In this way, the forward and rearward track sections guide the vehicles so that the vehicles can maintain a substantially horizontal orientation as the vehicles are driven along the curved track 315.

The rearward track sections may be configured so that the rearward axle of the vehicle 200 can be lifted while the vehicle is stopped at the pick station 300. By lifting the rearward axle of the vehicle 200, the container on the vehicle is tilted to present the contents of the container to the operator to facilitate the picking process.

The pick station 300 may include a plurality of items to improve the efficiency of the pick station. For instance, the pick station may include a monitor to display information to aid the operator. As the vehicle approaches the pick station, the system 10 may display information such as how many items need to be picked from the container for the order. Additionally, since the operator may pick items for multiple orders, the system may display which order(s) the item is to be picked for, in addition to how many of the item are to be picked for each order. The system may also display information such as how many items should be remaining in the container after the operator picks the appropriate number of items from the container.

One feature of the system as described above is that the orientation of the vehicles does not substantially change as the vehicles move from travelling horizontally (along the upper or lower rails) to vertically (down one of the columns). Specifically, when a vehicle is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the vehicle passes through a gate and then into a column, the two front geared wheels engage a pair of vertical legs 130 in the front track 115, and the two rear geared wheels engage the corresponding vertical legs in the rear track 120. It should be noted that when it is stated that the orientation of the vehicles relative to the horizon do not change, this refers to the travel of the vehicles around the track. Even though the vehicles may tilt relative to the horizon at the picking station, the vehicles are still considered to remain in a generally constant orientation relative to the horizon as the vehicles travel along the track 110.

As the vehicle travels from the horizontal rails to the vertical columns or from vertical to horizontal, the tracks allow all four geared wheels to be positioned at the same height. In this way, as the vehicle travels along the track it does not skew or tilt as it changes between moving horizontally and vertically. Additionally, it may be desirable to configure the vehicles with a single axle. In such a configuration, the vehicle would be oriented generally vertically as opposed to the generally horizontal orientation of the vehicles described above. In the single axle configuration, the weight of the vehicles would maintain the orientation of the vehicles. However, when using a single axle vehicle, the orientation of the storage locations would be re-configured to accommodate the vertical orientation of the vehicles.

Operation

Once the central controller determines the appropriate storage location 50 for the item, the route for a vehicle leaving the pick station 300 may be determined. Specifically, the central controller may determine the route for the vehicle and communicates information to the vehicle regarding the storage location into which the item is to be delivered. The central controller may then control the operation of the vehicle to actuate gates along the track as necessary to direct the vehicle to the storage location into which the item is to be delivered. Once the vehicle reaches the appropriate storage location, the vehicle stops at the storage location 50 and the container is displaced into the appropriate storage location. For example, the vehicle may be stopped at the appropriate storage location 100 and the onboard controller on the vehicle may send an appropriate signal to the vehicle to drive the chain 214, which advances the bar 212. Since the bar 212 is engaged in the slot 88 in the container, the bar drives the container off the vehicle and into the appropriate storage location.

After discharging the item, the vehicle 200 may travel to a second storage location to retrieve the next item to be transported to the picking station. After retrieving the item, the vehicle 200 may travel down the vertical legs 130 of the column until it reaches the lower rail 140. Gates may direct the vehicle along the lower rail, and the vehicle may follow the lower rail to return to the pick station 300 to deliver another item.

If the vehicle 200 delivers a container to an empty storage location, then the operation of the vehicle proceeds as described above. Similarly, if the vehicle retrieves a container 80 that is not connected with another container, then the operation of the vehicle proceeds as described. In particular, the vehicle stops adjacent the container. The loading/unloading mechanism advances into engagement with the container and then the loading/unloading mechanism pulls the container onto the vehicle. In contrast, the operation of the vehicle is modified if the vehicle carries a container to be placed in a storage location that already contains a container. Similarly, the operation of the vehicle is modified if the vehicle is retrieving a container attached to a container in a remote storage location.

Referring now to FIGS. 9 and 10A-10H, the operation of vehicle in retrieving a container from a storage location having "n" deep containers will be described. FIG. 9 illustrates an exemplary embodiment in which two racks 35, 40 of storage containers 80 are illustrated. The racks 35, 40 are separated from one another by an aisle and the vehicle 200 travels within the space between the racks. In the illustrated embodiment, the rack includes storage locations that have a depth sufficient to store two storage containers. The portion of the storage location that accommodates the storage container adjacent the aisle is referred to in this discussion as the inner cell and is designated 55. The portion of the storage location behind the inner cell 55 is referred to as the remote cell and is designated 57.

In the illustrated embodiment, each container includes a front connector 92 connected to the front end of the container and a rear connector 96 connected to a rear end of the container. The front connector of the container in the remote cell connects with rear connector of the container in the inner cell to create a releasable connection designated 90.

In FIG. 9, storage container 80A is stored in a remote cell behind storage container 80B that is stored in an inner cell. Containers 80A, 80B are releasably connected to one another by a connector, such as connector 90. The containers 80A, 80B are generally aligned from a horizontal perspective. The vehicle 200 is stopped at a position adjacent the storage location that houses container 80A. The vehicle 200 is empty (i.e. no container is loaded on the vehicle). The load/unload mechanism 210 engages the container 80A as shown in FIG. 9. For example, as shown in FIGS. 11 and 12, the front edge of the container 80 may extend into the aisle beyond the track (e.g. vertical track sections 130). In particular, the transfer groove 88 of the container 80 may extend into the aisle. The load bar 212 extends outwardly toward the container, away from the platform of the vehicle until the load bar is inserted into the transfer groove 88.

Referring to FIG. 10A, the load mechanism pulls the container 80A onto the vehicle 200. As the container 80A in the inner cell is pulled onto the vehicle, the container 80A pulls the container 80B in the remote cell toward the inner cell. In particular, the connector 90 connects the inner and remote containers 80A, 80B so that the containers move horizontally together.

Referring to FIG. 10B, vehicle continues to displace the container 80A onto the platform of the vehicle until the container is clear of the container in the storage location above the container. The displacement of container 80A pulls the remote container 80B into the inner cell so that container 80B has taken the place that container 80A had in the rack. It can be seen in FIG. 10B that by pulling container 80B into the inner cell, the remote cell 57 behind container 80B is now vacant.

As described above, the loading mechanism 210 of the vehicle loads the inner container 80A onto the vehicle, which in turns displaces the remote container 80B horizontally until the remote container is moved into a different storage locations, which in this instance is an inner cell. Continued displacement of the container 80A onto the vehicle would pull container 80B into the aisle and potentially onto the vehicle because the two containers remain connected. Accordingly, once the container 80B is displaced into the new storage location (i.e. the inner cell), the releasable connection 90 disconnects to thereby disconnect the two containers 80A, 80B.

Containers 80A, 80B may be disconnected in a variety of ways, depending on the mechanism that interconnects the containers. As noted previously, the connectors 92, 96 may be any of a variety of connectors that provide a releasable connection between two containers. The connectors may be mechanical or electro-mechanical. For example, the connectors 92, 96 could be magnetic elements, one of which may comprise an electro-magnet. The electro-magnet may be de-energized to disconnect the containers to facilitate relative motion of the first container relative to the second container. Alternatively, as described above, the connectors 92, 96 may be mechanical connectors, such as a pair of hooks or a tongue and groove arrangement. Accordingly, to disconnect the containers 80A, 80B, the connectors 92, 96 are disengaged. In one embodiment, the connectors 92, 96 are disengaged by displacing one of the containers vertically relative to the other container.

Referring to FIG. 10C, once the first container 80A is loaded onto the vehicle so that the container 80A is clear of the containers immediately above it or below it in the column, the container 80A is displaced vertically to disconnect container 80A from container 80B. As shown in FIGS. 13-14, the tongue 94B of connector 92B may project downwardly into the groove 98A of connector 96A. Therefore, the vehicle moves downwardly to vertically displace container 80A downwardly until the tongue 94B of connector 92B disengages the groove 98A as shown in FIG. 14. In this way, displacing the vehicle 200 vertically disconnects container 80A from container 80B. It should be understood, that the connectors 92, 96 may be configured differently so that the connectors are disconnected by moving the vehicle upwardly, rather than lowering the vehicle.

Referring now to FIG. 10D, after the first container 80A is disconnected from the second container 80B, the container 80A is displaced horizontally on the vehicle away from the second container. The first container is displaced horizontally until is centered within the aisle such that the container is clear from interfering or engaging any of the vehicles in the rack when the vehicle moves vertically upwardly or downwardly in the column. Once the container 80A is completely loaded onto the vehicle, the vehicle may advance toward the picking station 300 or other transfer location or to a different storage location. For example, the vehicle may move down to the lower horizontal rail and then along the horizontal rail to deliver container 80A to the picking station 300. Alternatively, the container 80A may be transported to another storage location and unloaded into the storage location.

The details of the steps of unloading the container 80A on vehicle 200 into a storage location in which a third container designated 80C is located are described below in connection with FIGS. 10E-10H. The vehicle 200 moves into position adjacent an inner cell in rack 40 in which container 80C is stored. The container 80A is unloaded from the vehicle toward the third container 80C. As the container 80A is unloaded, the container 80A pushes the third container 80C deeper into the storage location in the rack. Doing so displaces container 80C horizontally from the inner cell into the remote cell 57. During the process of unloading the first container 80A and displacing container 80C, the first container 80A is connected to the third container 80C. As described previously, the connectors of the two containers may be connected in a variety of ways. In the present instance, the containers are connected by moving one of the containers relative to the other. Specifically, the first container 80A is displaced vertically relative to the third container 80C to connect the two containers.

Referring again to FIG. 10E, to unload the first container 80A, the vehicle is displaced along the track until the first container 80A is disposed vertically higher than the third container 80C. In particular, the vehicle is driven to a position adjacent the container so that the front connector of the first container is positioned above the rear connector of the third container 80C. The first container is then displaced horizontally toward the third container 80C to partially unload the container from the vehicle, as shown in FIG. 10F. In the present instance, the first container is displaced until the front connector of the first container is aligned with the rear connector of the third container 80C. In particular, the unloading mechanism 210 of the vehicle displaces the container 80A horizontally until the tongue 94 of the front connector 92 is aligned with the groove 98 of the rear connector 96 on the third container 80C.

Once the connectors of container 80A and 80C are aligned, the vehicle moves vertically to connect the containers. Specifically, referring to FIG. 10G, the vehicle moves downwardly to horizontally align containers 80A and 80C and to interconnect the two containers. Once the first container 80A is aligned horizontally with the storage location, the first container is unloaded from the vehicle into the storage location as shown in FIG. 10H. For instance, in the present embodiment, the loading/unloading mechanism of the vehicle drives the first container 80A off of the vehicle and into the inner cell in which the third container 80C was located. As the first container is driven into the inner cell, the first container 80A pushes the third container 80C deeper into the storage location so that the third container is moved into the remote cell (designated 57 in FIG. 10G).

As described above, the first container 80A is moved into position adjacent the third container 80C. The two containers are then connected before unloading the first container into the storage rack. In this way, the containers are linked so that subsequently, the third container in the remote cell can be pulled toward the aisle when the first container 80A is retrieved (see e.g. FIGS. 10A-10D and description above). However, it should be appreciated that the containers do not need to be connected in order to unload the first container and move the third container into the remote cell. Specifically, since the first container 80A pushes the third container 80C rearwardly into the rear cell, the containers do not need to be connected prior to unloading the first container. Therefore, depending on the configuration of the front and rear connectors, the containers may be connected to one another after the first container is unloaded from the vehicle.

Accordingly, as described above, the system may be configured to incorporate multi-depth storage locations in which containers are stored behind one another in a common horizontal storage location. The containers in a common horizontal storage location may be interconnected so that retrieving one of the containers in the common storage location displaces the other containers in the common storage location forwardly toward the vehicle. In the above description, the operation has been described in which a first container is loaded onto a delivery vehicle, thereby pulling a container from a remote cell into an inner cell so that the container can be retrieved from the inner cell. The vehicle can then deliver the first container to a different storage locations and then return to retrieve the second container that was displaced into the inner cell. Alternatively, in certain instance, a storage location housing two containers (such as containers 80A and 80B shown in FIG. 9) may be located across from an open storage location vertically and horizontally aligned with the two containers. In such an instance, the first container 80A may be loaded onto the vehicle, thereby pulling the second container toward the vehicle. Rather than disconnecting the two containers as described above, the first container 80A is further displaced horizontally to unload the container into a storage location in the opposing rack. As the first container 80A is unloaded into the storage location, the second container 80B is pulled onto the vehicle. The second container can then be disconnected from the first container so that the vehicle can deliver the second container to the picking station or a different storage location. For instance, the vehicle can be displaced vertically to disconnect the second container from the first container.

In the foregoing description, a system is described in which containers are stored in multi-depth storage locations. A container in a remote cell of a multi-depth storage location may be retrieved by a vehicle first retrieving a container that is in front of the container in the remote cell. The retrieved container is then transported away by the vehicle. The retrieved container may then be stored in a different location so that the vehicle can return to retrieve the container that was located in the remote cell. Alternatively, a first vehicle may retrieve the container that is in front of the container in the remote cell and a second vehicle may come and retrieve the vehicle that was located in the remote cell.

Multiple Aisle Configurations

Turning now FIGS. 15A to 15F, there are shown respective side elevation views of a multiple aisle ASR system 1500 constructed in accordance with an alternate embodiment consistent with the present disclosure, the views of FIG. 15A to 15F collectively illustrating phases of an inter-aisle container transfer operation. Such a transfer operation enables any container to be retrieved from any storage location of any rack structure, as rack structures 1510, 1512, 1514 or 1514, and delivered to any pick station, as existing pick stations 1530 and 1532 located at positions PS1 and PS1, respectively, or any future pick stations located, for example, at position PS3.

FIGS. 15A to 15F exemplify an operation by which container 1580A containing one or more items required for retrieval at pick station 1532 is transferred from a storage region accessible only to a vehicle, as vehicle 200A, movable within aisle 1520A to a storage region accessible only to a vehicle, as vehicle 200B movable within aisle 1520B. To this end, the vehicle 200 depicted in FIG. 15A is shown conveying container 1580A from the initial, solid line position near the top of the aisle, to the dotted line position adjacent to a completely vacant storage location 1550 having open storage regions 1555 and 1557. The selection of a completely vacant storage location as location 1550 minimizes the number of container placement operations needed to affect the inter-aisle transfer.

As shown in FIG. 15B, the container 1580A is first transferred to the storage region 1550 which faces aisle 1520A. As described in connection with FIGS. 1-14, and shown in FIG. 15C, a container 1580B is withdrawn from an aisle facing storage location of rack structure 1510. For a quicker transfer operation, the container 1580B is selected based on its proximity to the storage region 1550 and the ability to move the container 1580B without first having to decouple it from a linked container behind it, as container 1580C. In the instant example, an uncoupling operation as described in connection with FIGS. 9 to 10G is performed such that container 1580B is decoupled from container 1580C before moving the former and latter into the positions shown, respectively, in FIG. 15D. In the process, container 1580A advances from the storage region 1555 facing aisle 1520A into the storage region 1557 facing aisle 1520B.4

In FIG. 15E, it can be seen that second vehicle 200B is aligned with the storage region 1557. By operation of the container extractor system previously described, container 1580A is withdrawn from storage region 1557 and, at the same time, the container 1580B behind it advances into the storage region 1557. Thereafter, the vehicle moves container 1580A to pick station 1532, as shown in FIG. 15F. As will be readily appreciated by those skilled in the art, transfers in the reverse direction (e.g., from pick station 1532 to a storage location of rack 1510) is achieved by reversing the operation described above. Likewise the process may be repeated in order to permit delivery of container 1580A to a pick station at location PS3.

FIG. 16 depicts yet another multiple aisle ASR system indicated generally at 1600. Aisle to aisle transfer of containers is simplified by using an alternating arrangement of n- and 1-deep storage locations, with racks 1610, 1614 and 1618 defining two back-to-back storage regions and 1612 and 1616 defining a single deep storage region through which containers, as container 1680A, may pass in either direction to permit a transfer or pick operation at any of pick stations 1630, 1632, 1634 or 1636. As shown in FIG. 16, each rack may include storage locations that are deep enough to accommodate multiple containers 1680 such as racks 1610, 1614 and 1618. Alternatively, each rack may include storage locations that are only deep enough to accommodate a single container 1680, such as racks 1612 and 1616. The depth of each rack may vary depending upon the particular application. However, regardless of the depth of the racks, each aisle includes tracks 130 on each side to support and guide the vehicles 200. Accordingly, racks that are between two aisles include track on each side of the rack. For instance, aisle 1620A is formed between rack 1610 and rack 1612. Rack 1610 is an end rack. Therefore, a first track 110A is attached to the side of the rack facing the aisle. Rack 1612 is an inside rack that is between aisle 1620A and 1620B. Accordingly, rack 1612 includes a first track 110B attached to the side aisle 1620A and a second track attached to the side facing aisle 1620B. It should be noted that the track illustrated in FIG. 16 is a fragmentary view of a portion of a vertical leg, such as leg 130 illustrated in FIG. 3A. It should be understood that the tracks 110A, 100B, 110C, 110D in FIG. 16 may be configured similarly to the track illustrated in FIG. 3a, having a plurality of vertical tracks interconnecting a plurality of horizontal tracks. Additionally, as noted previously, the track may be designed in a variety of configurations. Configured as illustrated in FIG. 16, vehicle 200A travels in aisle 1620A and is supported and guided on one side by track 110A and the other side by track 110B. The vehicle is operable to transfer storage containers, such as container 1680A between the vehicle and either rack 1610 or rack 1612. Similarly, vehicle 200B travels in aisle 1620B and is supported and guided on one side by track 110C and the other side by track 130D. In this way, vehicle 200B is operable to transfer containers, such as container 1680B between vehicle 200B and rack 1612 or rack 1614. Additionally, containers can be transferred between adjacent aisles so that a container 1680 from a first aisle can be transferred to a second aisle so that the item can be delivered to the pick station at the second aisle.

Referring now or FIG. 17, an alternate embodiment of an automated material handling system 1700 is illustrated. The system includes a plurality of racks 1710, 1712, 1714, 1716. Each rack includes a plurality of storage locations 1757. As described above, the rack of storage locations may be configured as an array of storage locations, such as an array of columns or an array of rows. An aisle is formed between adjacent racks, such as aisle 1720A, 1720B and 1720C. The system 1700 includes a plurality of vehicles that travel within the aisles. As discussed previously, each vehicle is guided by a track within the aisle. For example, a first track 110A located adjacent a first side of rack 1710 guides and supports a first end of vehicle 200A in aisle 1720A and a second track 110B adjacent a first side of rack 1712 guides and supports a second end of vehicle 200B in aisle 1720A. Similarly, rack 1712 includes a second track 110C positioned adjacent the second side of rack 1712. The second track positioned adjacent rack 1712 forms a portion of the track supporting vehicle 200B in aisle 1720B. In this way, racks positioned between two aisles include track on both sides of the rack, such as rack 1712, which is positioned between track 110B and 110C, and rack 1714, which is positioned between track 110D and 110E.

As shown in FIG. 17, a container can be transferred between adjacent aisles so that a container stored in one aisle can be transferred to a different aisle so the container can be conveyed to the picking station. In this way, each picking station has access to all the container in all the aisles. For example, in FIG. 17 a container 1780 is originally stored in location 1757D, which is in a third aisle, designated 1720C. Vehicle 200C operates within the third aisle 1720C. Therefore, vehicle 200C is able to move in the third aisle along tracks 110E, 110F so that vehicle 200C is aligned with storage location 1757D. Container 1780 is then transferred onto vehicle 200C (note that the container 1780 is shown in dashed lines on vehicle 200C because the container is subsequently transferred to vehicle 200B as described below). The vehicle 200C then transfers the container 1780 to a storage location in rack 1714, which is a rack that is between the third aisle 1720C and a second aisle 1720B. In some situations, the vehicle may be able to transfer the container directly to the opposing rack 1714. However, in the example illustrated in FIG. 17, the vehicle moves upwardly toward location 1757C in rack 1714.

After the container 1780 is moved from the first rack to the second rack, vehicle 200B in the second aisle 1720B may retrieve the container. As discussed above, the vehicle retrieves the container 1780 by traveling along tracks 110C and 110D until the vehicle is aligned with storage location 1757C. The container is then transferred onto the second vehicle 200B as shown in FIG. 17. The vehicle is operable to transport the container to picking station 1732, which is positioned along aisle 1720B. Additionally, the vehicle may deliver item 1780 to storage location 1757B, so that vehicle 200A in aisle 1720A can retrieve the container from location 1757B. In this way, vehicle 200A can deliver the container to picking station 1730. Additionally, after delivering the item to picking station 1730, the vehicle 200A may store the container in open storage location 1757A in rack 1710.

From the foregoing, it should be understood that the system may include a number of racks forming one or more aisles in which vehicles travel. If the system includes two or more aisles, the racks may be configured so that one or more racks is adjacent two aisles. Therefore, an item transferred to such rack from a vehicle in one aisle can be retrieved by a vehicle in an adjacent aisle. In some embodiments, the racks that are adjacent two aisles are n-deep racks, meaning that storage locations in the racks are deep enough to accommodate a plurality of storage containers. In some embodiments, the racks that are adjacent two aisles are single depth racks, meaning that the storage locations in the racks are deep enough to accommodate a single storage container.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for storing and retrieving containers within a system having a first rack of locations and a second rack of locations separated from the first rack by an aisle, comprising the steps of:
    driving a first vehicle vertically within the aisle;
    transferring a first container onto the first vehicle from a first location in the first or second rack, wherein the step of transferring the first container displaces a second container from a second location to the first location;
    disconnecting the first container from the second container;
    driving the first vehicle vertically within the aisle a second time to align the first vehicle with a third location in the first or second rack;
    transferring the first container from the first vehicle into the third location;
    driving the first vehicle within the aisle a third time to align the first vehicle with the first location a second time;
    transferring the second container onto the first vehicle from the first location;
    driving the first vehicle away from the first location to transfer the second container to an area away from the first location.

2. The method of claim 1 wherein the step of transferring a first container onto the first vehicle from a first location comprises the step of pulling the second container from the second location to the first location.

3. The method of claim 1 comprising the step of driving a second vehicle vertically within the aisle to retrieve the first container from the third location.

4. The method of claim 1 wherein the step of driving the first vehicle away from the first location comprises driving the vehicle to a pick station and the method includes the step of removing an item from the second container at the pick station.

5. The method of claim 4 comprising the steps of driving the first vehicle from the pick station to a fourth location in the first or second rack and transferring the second container to the fourth location.

6. The method of claim 1 wherein the step of disconnecting the first and second containers comprises moving the first container vertically relative to the second container.

7. The method of claim 1 comprising the step of connecting the first container with a third container positioned in the third location, wherein the step of transferring the first container into the third location comprises displacing the third container into a fourth location.

8. The method of claim 7 wherein the step of displacing the third container comprises pushing the third container with the first container.

9. The method of claim 1 wherein the step of driving the first vehicle vertically comprises simultaneously driving the first vehicle along a first guide mounted on the first rack and a second guide mounted on the second rack.

10. The method of claim 1 wherein the first, second and third locations are aligned within a column of the first and second racks so that the steps of driving the first vehicle vertically comprise driving the first vehicle vertically within the column.

11. The method of claim 10 wherein the step of driving the first vehicle away comprises driving the first vehicle out of the column.

12. The method of claim 1 wherein the step of transferring a first container onto the first vehicle comprises the step of extending a transfer mechanism from the first vehicle and retracting the transfer mechanism to pull the first and second containers toward the first vehicle.

13. The method of claim 12 wherein the step of retracting the transfer mechanism pulls the first container onto the first vehicle.

14. An apparatus for storing and retrieving containers, comprising:
    a first rack comprising a plurality of locations vertically separated from one another;
    a vertical track positioned adjacent the first rack;
    a plurality of independently operable vehicles configured to cooperate with the vertical guide to drive vertically to the plurality of locations wherein each vehicle comprises a transfer mechanism configured to transfer containers between the locations and the vehicles;
    a controller configured to control operation of the vehicles, wherein the controller is configured to control the operation of one of the vehicles to drive the first vehicle vertically along the guide, transfer a first container onto the first vehicle from a first location in the first or second rack thereby displacing a second container from a second location to the first location, disconnect the first container from the second container, drive the first vehicle vertically within the aisle a second time to align the first vehicle with a third location in the first or second rack, transfer the first container from the first vehicle into the third location, drive the first vehicle within the aisle a third time to align the first vehicle with the first location a second time, transfer the second container onto the first vehicle from the first location and drive the first vehicle away from the first location to transfer the second container to an area away from the first location.

* * * * *